US012568394B2

(12) United States Patent (10) Patent No.: US 12,568,394 B2
Xu et al. (45) Date of Patent: Mar. 3, 2026

(54) COMMUNICATION METHOD AND APPARATUS

(71) Applicant: HUAWEI TECHNOLOGIES CO., LTD., Guangdong (CN)

(72) Inventors: Bin Xu, Beijing (CN); Bingzhao Li, Beijing (CN); Zhenzhen Cao, Boulogne Billancourt (FR); Yan Wang, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 397 days.

(21) Appl. No.: 18/304,624

(22) Filed: Apr. 21, 2023

(65) Prior Publication Data

US 2023/0262515 A1 Aug. 17, 2023

Related U.S. Application Data

(63) Continuation of application No. PCT/CN2020/123009, filed on Oct. 22, 2020.

(51) Int. Cl.
*H04W 28/02* (2009.01)

(52) U.S. Cl.
CPC ... *H04W 28/0273* (2013.01); *H04W 28/0268* (2013.01)

(58) Field of Classification Search
CPC ......... H04W 28/0273; H04W 28/0268; H04W 28/0263; H04L 47/34
See application file for complete search history.

(56) References Cited

U.S. PATENT DOCUMENTS

| | | | | |
|---|---|---|---|---|
| 2008/0037548 A1* | 2/2008 | Yi | H04L 69/04 | |
| | | | 370/310 | |
| 2017/0289021 A1* | 10/2017 | Säily | H04W 36/28 | |
| 2019/0037443 A1* | 1/2019 | Lee | H04L 47/34 | |
| 2020/0022213 A1 | 1/2020 | Han et al. | | |
| 2020/0154320 A1* | 5/2020 | Xu | H04W 36/0016 | |
| 2020/0351701 A1* | 11/2020 | Godin | H04L 1/1642 | |
| 2021/0014756 A1* | 1/2021 | Liu | H04W 36/18 | |

(Continued)

FOREIGN PATENT DOCUMENTS

| | | |
|---|---|---|
| WO | 2019223267 A1 | 11/2019 |
| WO | 2020024948 A1 | 2/2020 |

OTHER PUBLICATIONS

Extended European Search Report in European Appln No. 20958262.6, dated Sep. 25, 2023, 13 pages.

(Continued)

*Primary Examiner* — Sudesh M. Patidar
(74) *Attorney, Agent, or Firm* — Fish & Richardson P.C.

(57) ABSTRACT

This application provides example communication methods and apparatuses. In one example method applied to an first access network device, the method comprises receiving a first data packet of a first session from a core network device, where the first data packet comprises a first sequence number (SN). A second data packet is sent to a terminal device, where the second data packet belongs to data of a first data radio bearer (DRB), the second data packet comprises a packet data convergence protocol (PDCP) protocol data unit (PDU), the PDCP PDU is obtained based on the first data packet, and a PDCP SN of the PDCP PDU is determined based on the first SN.

16 Claims, 9 Drawing Sheets

(56)    References Cited

U.S. PATENT DOCUMENTS

| | | | |
|---|---|---|---|
| 2021/0234660 A1* | 7/2021 | You | H04W 76/12 |
| 2021/0258111 A1* | 8/2021 | Xu | H04L 5/0044 |
| 2021/0336893 A1 | 10/2021 | Li et al. | |
| 2022/0303823 A1* | 9/2022 | Guo | H04W 76/20 |
| 2023/0199805 A1* | 6/2023 | Liu | G06Q 10/06395 |
| | | | 370/312 |

OTHER PUBLICATIONS

3GPP TS 38.300 V16.3.0, "3rd Generation Partnership Project; Technical Specification Group Radio Access Network; NR; NR and NG-RAN Overall Description; Stage 2 (Release 16)," Sep. 2020, 148 pages.

* cited by examiner

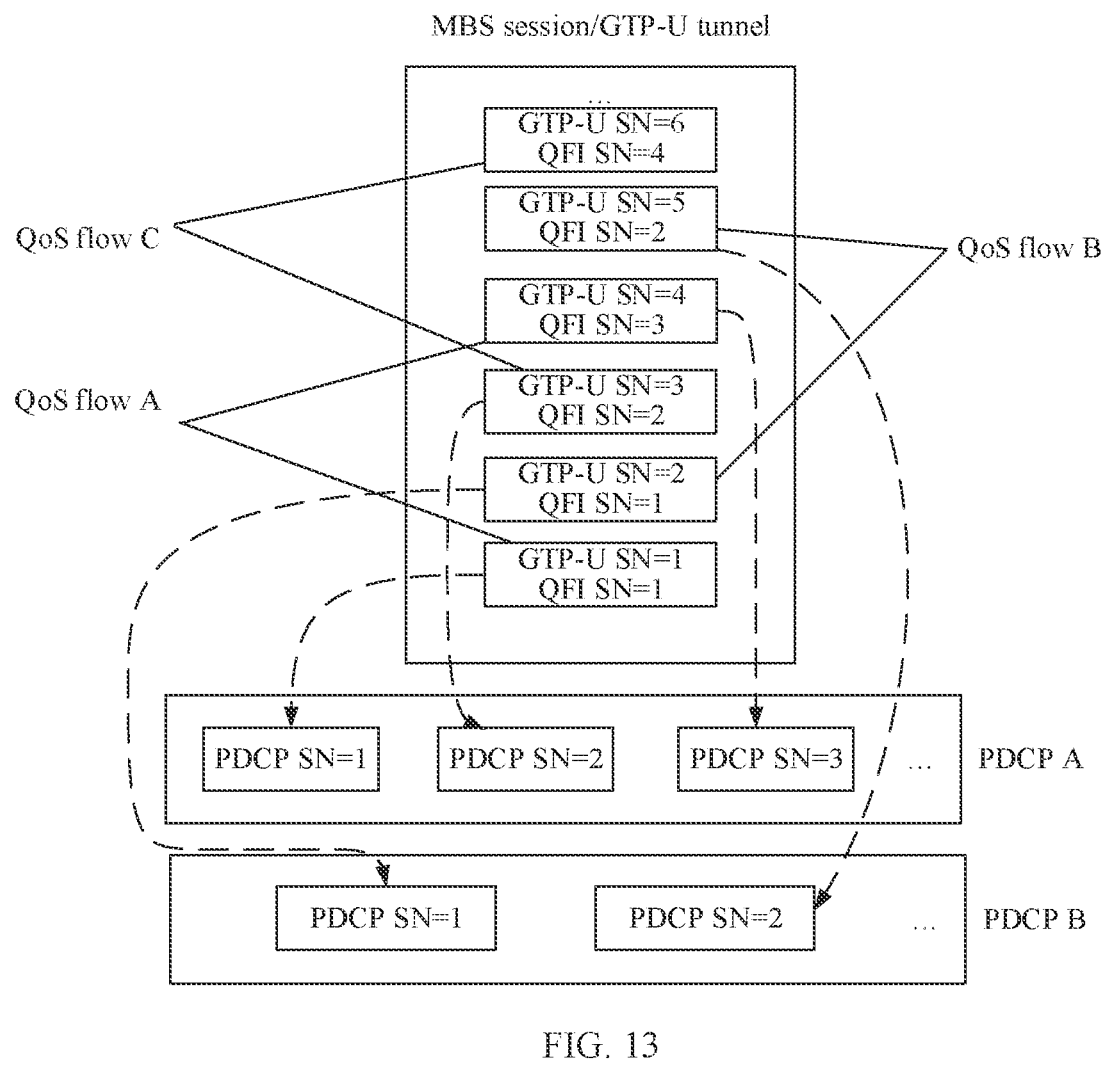

MBS session/GTP-U tunnel

...

GTP-U SN=6
QFI SN=4

GTP-U SN=5
QFI SN=2

GTP-U SN=4
QFI SN=3

GTP-U SN=3
QFI SN=2

GTP-U SN=2
QFI SN=1

GTP-U SN=1
QFI SN=1

QoS flow C

QoS flow A

QoS flow B

PDCP SN=1    PDCP SN=2    PDCP SN=3    ...    PDCP A

PDCP SN=1    PDCP SN=2    ...    PDCP B

FIG. 13

COMMUNICATION METHOD AND APPARATUS

CROSS-REFERENCE TO RELATED APPLICATIONS

This application is a continuation of International Application No. PCT/CN2020/123009, filed on Oct. 22, 2020, the disclosure of which is hereby incorporated by reference in its entirety.

TECHNICAL FIELD

This application relates to the field of wireless communication technologies, and in particular, to a communication method and apparatus.

BACKGROUND

A multimedia broadcast multicast service (multimedia broadcast multicast service, MBMS in LTE) in a long term evolution (long term evolution, LTE) system or a groupcast/multicast broadcast service (multicast broadcast service, MBS) in a new radio (new radio, NR) system is mainly applicable to services oriented to a plurality of terminal devices, for example, live broadcast and scheduled program playing.

Currently, when the MBS service is sent from a core network to an access network device (for example, a base station), the MBS service is transmitted through a shared MBS session. One MBS session corresponds to one transmission channel (for example, a general packet radio service (general packet radio service, GPRS) tunneling protocol-user plane (GPRS tunneling protocol-user plane, GTP-U) tunnel or an N3 interface), and one MBS session may include one or more quality of service (quality of service, QoS) flows (flows).

On an access network device side, the access network device may determine a mapping relationship between a QoS flow and a data radio bearer (data radio bearer, DRB), to map the one or more QoS flows to a same DRB for transmission. After being processed at a PDCP layer in the DRB, a data packet in the QoS flow becomes a PDCP PDU, where the PDCP PDU carries a PDCP SN, and different data packets carry different PDCP SNs.

In a current MBS transmission mechanism, different access network devices independently transmit an MBS service. When UE moves between the different access network devices, a packet loss may occur because MBS service sending progresses of two access network devices are inconsistent, and continuity of MBS service transmission cannot be ensured.

SUMMARY

This application provides a communication method and apparatus, to ensure that a PDCP SN of a same data packet of an MBS service transmitted by different access network devices is the same, and improve continuity of MBS service transmission.

According to a first aspect, embodiments of this application provide a communication method. The method may be performed by a first access network device or a component (for example, a processor, a chip, or a chip system) in the first access network device. The first access network device supports MBS data transmission. For example, the first access network device is a source base station or a target base station in a UE handover scenario.

According to the method, the first access network device may receive a first data packet of a first session from a core network device, where the first data packet includes a first SN. The first access network device may further send a second data packet to a terminal device, where the second data packet belongs to data of a first DRB (or the second data packet belongs to the first DRB), the second data packet includes a PDCP PDU, the PDCP PDU is obtained based on the first data packet, and a PDCP SN of the PDCP PDU is determined based on the first SN.

Based on the foregoing method, the access network device may determine, based on the first SN in the first data packet, the PDCP SN of the PDCP PDU corresponding to the first data packet. When different access network devices determine, based on the first SN in the first data packet, PDCP SNs corresponding to different access network devices, PDCP SNs determined by different access network devices for data packets with the same first SN from the core network device are consistent. In this way, when UE is handed over between different access network devices, transmission progresses of MBS services of two access network devices may be determined based on transmission statuses of PDCP SNs of different access network devices, and further, a loss of data packets of the MBS services is avoided through a data forwarding mechanism, thereby ensuring continuity of MBS service transmission. To ensure the continuity of the MBS service transmission, a packet loss needs to be minimized.

In a possible example, the first session is in a one-to-one correspondence with the first DRB, and the first SN is a GTP-U SN.

Based on the design, when the first session to which the first data packet belongs is in a one-to-one correspondence with the first DRB, the access network device determines, based on a GTP-U SN of the first data packet, the PDCP SN corresponding to the first data packet, to ensure that PDCP SNs of same data packets determined by different access network devices are consistent.

In a possible design, the first data packet belongs to a data packet of a first QoS flow, where the first QoS flow belongs to one of at least one QoS flow included in the first session. The second data packet belongs to a data packet of the first DRB, the first QoS flow is in a one-to-one correspondence with the first DRB, and the first SN is a QFI SN.

Based on the design, when the QoS flow to which the first data packet belongs is in a one-to-one correspondence with the first DRB, the access network device determines, based on a QFI SN of the first data packet, the PDCP SN corresponding to the first data packet, to ensure that PDCP SNs of same data packets determined by different access network devices are consistent.

In a possible design, first information is sent to the core network device, where the first information indicates a mapping relationship between at least one QoS flow included in the first session and at least one DRB, and the at least one DRB includes the first DRB.

Based on the design, the first access network device may report, to the core network device, the MBS session or the mapping relationship between the QoS flow and the DRB in the MBS session. The core network device sets the first SN in the first data packet based on the mapping relationship, so that different access network devices may obtain a same PDCP SN when determining the PDCP SN based on the first SN in the first data packet.

In a possible design, the first information indicates a mapping relationship between each of the at least one DRB and at least one or more QoS flows of the at least one QoS flow.

Based on the design, the first access network device may report, to the core network device, the MBS session or the mapping relationship between the QoS flow and the DRB in the MBS session. The core network device sets the first SN in the first data packet based on the mapping relationship, so that different access network devices may obtain a same PDCP SN when determining the PDCP SN based on the first SN in the first data packet.

In a possible design, the first data packet belongs to the first session, and the first DRB corresponds to all or a part of at least one QoS flow included in the first session; and the first SN includes a first GTP-U SN, the first PDCP SN is N0, the first access network device may further receive at least one third data packet from the core network device, the at least one third data packet is mapped to the first DRB, and a GTP-U SN included in the at least one third data packets greater than the first GTP-U SN. The first access network device may further determine that a PDCP SN corresponding to an $i^{th}$ third data packet in the at least one third data packet that is sorted in a first order is N0+i, where the first order includes an ascending order of GTP-U SNs separately included in the at least one third data packet, and i is an integer greater than or equal to 0.

Based on the design, the first access network device may receive at least one third data packet from the core network device. A PDCP SN corresponding to each third data packet may be determined based on a size of the GTP-U SN of the third data packet, a size of a GTP-U SN of the first data packet, and a size of a PDCP SN corresponding to the first data packet, so that PDCP SNs corresponding to a same data packet determined by different access network devices are the same.

In a possible design, the first access network device may further send second information to a second access network device, where the second information indicates a correspondence between at least one PDCP SN and at least one GTP-U SN, and the correspondence includes at least one of the following: a correspondence between N0 and the first GTP-U SN; a correspondence between N0+i and a GTP-U SN of the $i^{th}$ third data packet in the at least one third data packet that is sorted in the first order; or a correspondence between N0+I+1 and M+1, where I is a quantity of third data packets, and M is a GTP-U SN of an $I^{th}$ third data packet in the at least one third data packet that is sorted in the first order.

Based on the design, when the first access network device and the second access network device start to transmit MBS service data first and then, PDCP SNs of same data packets determined by the first access network device and the second access network device may be kept consistent.

In a possible design, the first access network device may receive a PDCP SN corresponding to the first SN, where the PDCP SN of the PDCP PDU includes the PDCP SN corresponding to the first SN.

Based on the design, the first access network device may determine, based on an indication sent by another access network device or the core network device, the PDCP SN corresponding to the first data packet, to keep the PDCP SN corresponding to the first data packet determined by different access network devices consistent. For example, when the second access network device starts transmitting the MBS service data before the first access network device does, the second access network device may send, to the first access network device, a correspondence between the PDCP SN corresponding to the first data packet determined by the second access network device and the GTP-U SN of the first data packet. After receiving the first data packet, the first access network device may change the correspondence to determine the PDCP SN corresponding to the first data packet.

In a possible design, the first SN further includes a QFI SN, and the first access network device may further determine, based on a quantity of consecutively lost data packets in all QoS flows corresponding to the first DRB, a PDCP SN of a data packet with a smallest GTP-U SN after the consecutively lost data packets.

Based on the design, when a packet loss occurs in a data packet sent by the core network device to the first access network device, it may be avoided that PDCP SNs determined for a same data packet by the first access network device and another access network device are different.

According to a second aspect, embodiments of this application provide a communication method. The method may be performed by a core network device or a component (for example, a processor, a chip, or a chip system) in the core network device.

According to the method, the core network device may receive first information from a first access network device, where the first information indicates a mapping relationship between at least one QoS flow included in a first session and at least one DRB. The core network device may further sequentially set, in ascending order of GTP-U SNs, a first SN of a data packet in at least one QoS flow corresponding to a first DRB, where the at least one DRB includes the first DRB, and the data packet in the QoS flow corresponding to the first DRB includes a first data packet of the first session. The core network device may further send the first data packet to the first access network device through a first QoS flow in the first session, where the first QoS flow is one of the at least one QoS flow that is included in the first session and that corresponds to the first DRB.

For the first information, refer to descriptions in the first aspect and the possible design in the first aspect.

For beneficial effects shown in the second aspect, refer to the beneficial effects in the first aspect.

According to a third aspect, embodiments of this application provide a communication apparatus, which may implement the method implemented by the first access network device in the first aspect or any possible design in the first aspect. The apparatus includes a corresponding unit or component configured to perform the foregoing method. The unit included in the apparatus may be implemented by software and/or hardware. For example, the apparatus may be a first access network device, or may be a component, a baseband chip, a chip system, or a processor that may support the first access network device in implementing the foregoing method.

For example, the communication apparatus may include modular components such as a transceiver unit (or referred to as a communication module or a transceiver module) and a processing unit (or referred to as a processing module). These modules may perform corresponding functions of the first access network device in the first aspect or any possible design in the first aspect. When the communication apparatus is the first access network device, the transceiver unit may be a transmitter and a receiver, or a transceiver obtained by integrating the transmitter and the receiver. The transceiver unit may include an antenna, a radio frequency circuit, or the like. The processing unit may be a processor, for example, a baseband chip. When the communication apparatus is a component having a function of the first access network device, the transceiver unit may be a radio frequency unit, and the processing unit may be a processor. When the communication apparatus is a chip system, the transceiver unit may be an input/output interface of the chip system, and the processing unit may be a processor of the chip system, for example, a central processing unit (central processing unit, CPU).

The transceiver unit may be configured to perform a receiving and/or sending action performed by the first access network device in the first aspect or any possible design in the first aspect. The processing unit may be configured to perform an action other than receiving and sending performed by the first access network device in the first aspect or any possible design in the first aspect, for example, determine, based on a first SN, a PDCP SN corresponding to a first data packet.

According to a fourth aspect, embodiments of this application provide a communication apparatus, which may implement the method implemented by the core network device in the second aspect or any possible design in the second aspect. The apparatus includes a corresponding unit or component configured to perform the foregoing method. The unit included in the apparatus may be implemented by software and/or hardware. The apparatus may be, for example, a core network device, or a component, a baseband chip, a chip system, or a processor that may support the core network device in implementing the foregoing method.

For example, the communication apparatus may include modular components such as a transceiver unit (or referred to as a communication module or a transceiver module) and a processing unit (or referred to as a processing module). These modules may perform corresponding functions of the core network device in the second aspect or any possible design in the second aspect. When the communication apparatus is the core network device, the transceiver unit may be a transmitter and a receiver, or a transceiver obtained by integrating the transmitter and the receiver. The transceiver unit may include an antenna, a radio frequency circuit, or the like. The processing unit may be a processor, for example, a baseband chip. When the communication apparatus is a component having a function of the core network device, the transceiver unit may be a radio frequency unit, and the processing unit may be a processor. When the communication apparatus is a chip system, the transceiver unit may be an input/output interface of the chip system, and the processing unit may be a processor of the chip system, for example, a central processing unit (central processing unit, CPU).

The transceiver unit may be configured to perform a receiving and/or sending action performed by the core network device in the second aspect or any possible design in the second aspect. The processing unit may be configured to perform an action other than receiving and sending performed by the core network device in the second aspect or any possible design in the second aspect.

According to a fifth aspect, a communication system is provided. The communication system includes the communication apparatus shown in the third aspect and the communication apparatus shown in the fourth aspect.

According to a sixth aspect, a computer-readable storage medium is provided. The computer-readable storage medium is configured to store computer instructions, and when the computer instructions are run on a computer, the computer is enabled to perform the method according to the first aspect and the second aspect or any possible implementation in the first aspect and the second aspect.

According to a seventh aspect, a computer program product including instructions is provided. When the instructions are run on a computer, the computer is enabled to perform the method according to the first aspect and the second aspect or any possible implementation in the first aspect and the second aspect.

According to an eighth aspect, a circuit is provided. The circuit is coupled to a memory, and the circuit is configured to perform the method according to the first aspect and the second aspect or any possible implementation in the first aspect and the second aspect. The circuit may include a chip circuit.

BRIEF DESCRIPTION OF DRAWINGS

FIG. 13 is a schematic diagram of another forwarding manner of MBS service data of an access network device according to an embodiment of this application.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment.

Figure 1:
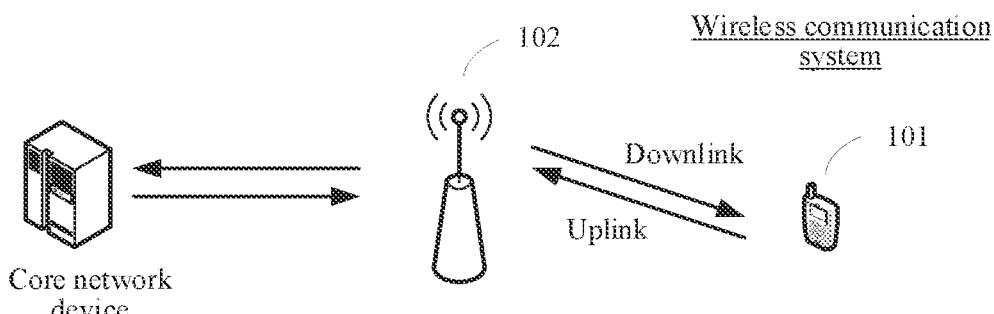
FIG. 1 is a schematic diagram of an architecture of a communication system according to an embodiment of this application.

As shown in FIG. 1, a communication method provided in embodiments of this application may be applied to a wireless communication system, and the wireless communication system may include a terminal device 101 and a network device 102.

It should be understood that the foregoing wireless communication system is applicable to both a low-frequency scenario (sub 6G) and a high-frequency scenario (above 6G). An application scenario of the wireless communication system includes but is not limited to a fifth generation system, a new radio (new radio, NR) communication system, a future evolved public land mobile network (public land mobile network, PLMN) system, or the like.

The terminal device 101 may be user equipment (user equipment, UE), a terminal (terminal), an access terminal, a terminal unit, a terminal station, a mobile station (mobile station, MS), a remote station, a remote terminal, a mobile terminal (mobile terminal), a wireless communication device, a terminal agent, a terminal device, a cellular phone, a cordless phone, a session initiation protocol (session initiation protocol, SIP) phone, a wireless local loop (wireless local loop, WLL) station, a personal digital assistant (personal digital assistant, PDA) device, a handheld device having a wireless communication function, a computing device, another processing device connected to a wireless modem, an in-vehicle device, a wearable device, a terminal apparatus in a future 5G network, a terminal apparatus in a future evolved PLMN network, or the like. The terminal device 101 may have a wireless transceiver function. The terminal device 101 can perform communication (for example, wireless communication) with one or more network devices in one or more communication systems, and accepts a network service provided by the network device. The network device herein includes but is not limited to the network device 102 shown in the figure.

In addition, the terminal device 101 may be deployed on land, where the deployment includes indoor or outdoor, or handheld or vehicle-mounted deployment, the terminal device 101 may be deployed on water (for example, on a ship), or the terminal device 101 may be deployed in air (for example, on an aircraft, a balloon, or a satellite). The terminal device 101 may be specifically a mobile phone (mobile phone), a pad (pad), a computer having a wireless transceiver function, a virtual reality (virtual reality, VR) terminal, an augmented reality (augmented reality, AR) terminal, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The terminal device 101 may alternatively be a communication chip having a communication module, or may be a vehicle having a communication function, or an in-vehicle device (for example, an in-vehicle communication apparatus or an in-vehicle communication chip), or the like.

The network device 102 may be an access network device (or referred to as an access network site). The access network device is a device that provides a network access function, for example, a radio access network (radio access network, RAN) base station (or referred to as a RAN device), or the like. The network device 102 may specifically include a base station (base station, BS), or include a base station, a radio resource management device configured to control the base station, and the like. The network device 102 may further include a relay station (relay device), an access point, a base station in a future 5G network, a base station in a future evolved PLMN network, an NR base station, or the like. The network device 102 may be a wearable device or a vehicle-mounted device. Alternatively, the network device 102 may be a communication chip having a communication module.

For example, the network device 102 includes but is not limited to: a next generation NodeB (gNodeB, gNB) in 5G, an evolved NodeB (evolved NodeB, eNB) in a long term evolution (long term evolution, LTE) system, a radio network controller (radio network controller, RNC), a radio controller in a cloud radio access network (cloud radio access network, CRAN) system, a base station controller (base station controller, BSC), a home evolved NodeB (for example, a home evolved NodeB or a home NodeB, HNB), a baseband unit (baseband unit, BBU), a transmission and reception point (transmission and reception, TRP), a transmitting point (transmitting point, TP), a mobile switching center, a base transceiver station (base transceiver station, BTS) in a global system for mobile communication (global system for mobile communication, GSM) or code division multiple access (code division multiple access, CDMA) network may be a NodeB (NodeB, NB) in wideband code division multiple access (wideband code division multiple access, WCDMA), or may be an evolved (evolved) NB (eNB or eNodeB) in LTE, or may be a base station device in a future 5G network or an access network device in a future evolved PLMN network, or may be a wearable device or an in-vehicle device.

In some deployments, the network device may include a central unit (central unit, CU) and a distributed unit (distributed unit, DU). The network device may further include an active antenna unit (active antenna unit, AAU). The CU implements some functions of the network device, and the DU implements some other functions of the network device. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device (which may be referred to as a CN device) in a core network (core network, CN). This is not limited in this application.

In addition, the network device 102 may be connected to a core network (core network, CN) device, and the core network device may be configured to provide a core network service for the access network device 102 and the terminal device 101. The core network device may correspond to different devices in different systems. For example, in 3G, the core network device may correspond to a serving general packet radio service (general packet radio service, GPRS) support node (serving GPRS support node, SGSN) and/or a gateway GPRS support node (gateway GPRS Support Node, GGSN). In 4G, the core network device may correspond to a mobility management entity (mobility management entity, MME) and/or a serving gateway (serving gateway, S-GW), or the like. In 5G, the core network device may correspond to an access and mobility management function (access and mobility management function, AMF) entity, a session management function (session management function, SMF) entity, a user plane function (user plane function, UPF) entity, or the like.

It should be understood that in FIG. 1, the network device 102 may be further connected to at least one terminal device other than the terminal device 101. Therefore, the at least one terminal device including the terminal device 101 may receive an MBS service through the network device 102.

Based on the architecture shown in FIG. 1, when the MBS service is sent from a core network to the network device 102, the MBS service may be transmitted through a shared MBS session. One MBS session corresponds to one transmission channel (for example, a GTP-U tunnel or an N3 interface), and one MBS session may include one or more QoS flows. The QoS flow may also be referred to as an MBS flow. When sending a data packet to the access network device, the core network device carries a GTP-U sequence number (sequence number, SN) and/or a QoS flow identifier (QoS flow identifier, QFI) SN in the data packet. GTP-U SNs of a plurality of data packets in a same MBS session are consecutively arranged, and QFI SNs of a plurality of data packets in a same QoS flow are consecutively arranged.

Figure 2:
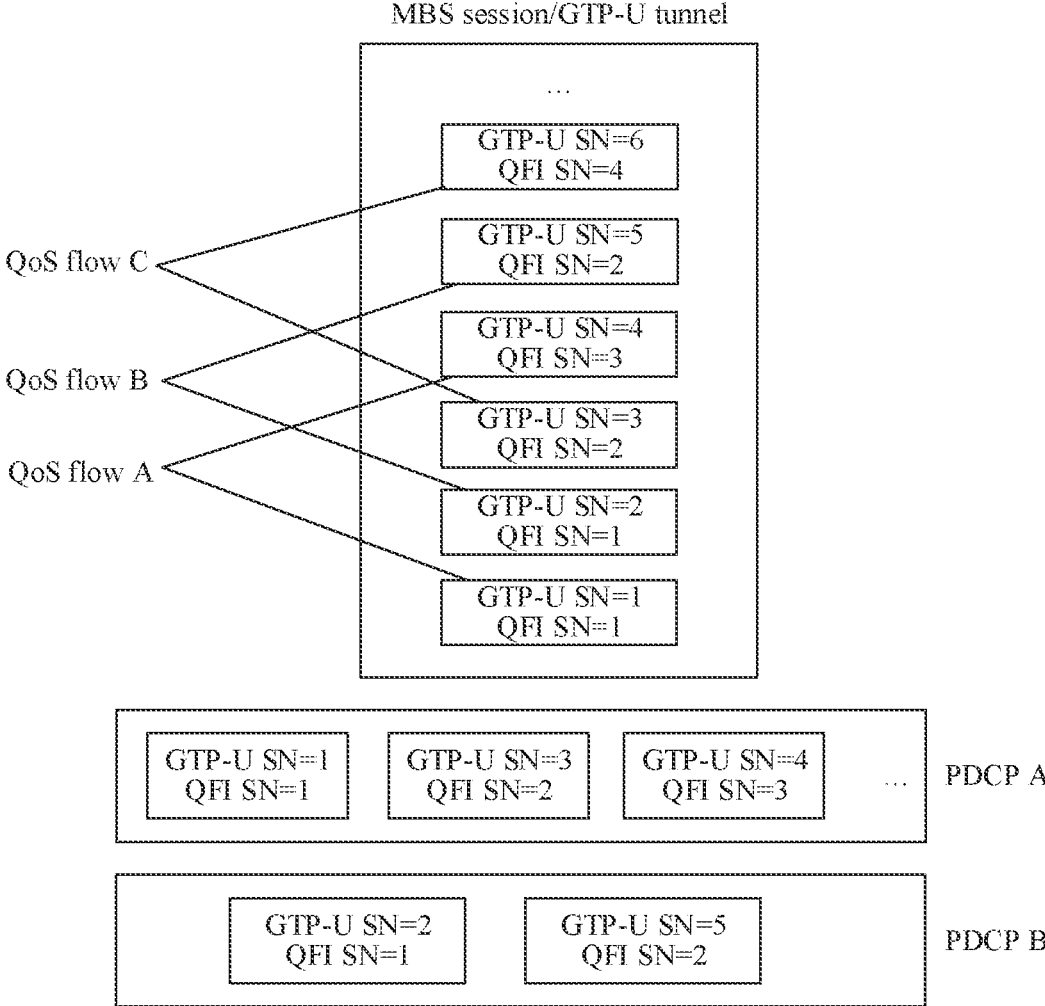
FIG. 2 is a schematic diagram of a forwarding manner of MBS service data of an access network device.

As shown in FIG. 2, one MBS session/GTP-U tunnel includes three QoS flows, each data packet carries the GTP-U SN, and the QoS flows are not distinguished in the GTP-U SN, and the GTP-U SN is in ascending order. Optionally, each data packet may further carry the QFI SN, and the QFI SN is independently set for a data packet of each QoS flow. To be specific, for a data packet of a QoS flow A, the QFI SN is in ascending order from an initial value. Similarly, for a data packet of a QoS flow B and a data packet of a QoS flow C, the QFI SN is also in ascending order from an initial value, and QFI SNs of the three QoS flows are set independently.

In addition, after receiving the data packet through the N3 interface, the network device 102 maps the MBS session or an MBS flow in the MBS session to a DRB, to transmit the data packet in the MBS session or the QoS flow to UE through a corresponding DRB. Each DRB corresponds to one PDCP entity, that is, a configuration of each DRB includes a configuration of one PDCP entity. Therefore, in FIG. 2, when it indicates that the MBS flow is mapped to the DRB, the PDCP entity may be used to replace the DRB. For example, a data packet mapped to a PDCP A is transmitted to the UE by using a corresponding DRB A, and a data packet mapped to a PDCP B is transmitted to the UE by using a corresponding DRB B.

In FIG. 2, it is assumed that the network device 102 maps the QoS flow A and the QoS flow C to the PDCP A (DRB A), and maps the QoS flow B to the PDCP B (DRB B). Finally, the data packet of the QoS flow A and the data packet of the QoS flow C are transmitted through the DRB A, and the data packet of the QoS flow B is transmitted through the DRB B. A PDCP SN needs to be added to a PDCP packet header of each data packet in a PDCP entity of each DRB, so that the PDCP entity processes the data packet.

When the network device 102 sends data to the terminal device 101, the network device 102 may send MBS service data to the terminal device in a point-to-multipoint (point-to-multipoint, PTM) or point-to-point (point-to-point, PTP) transmission manner, and the terminal device receives the MBS service data in a corresponding manner. The terminal device includes but is not limited to the terminal device 101.

In this application, sending in the PTM transmission manner means that when an apparatus sends a transport block (transport block, TB) corresponding to a protocol data unit (protocol data unit, PDU), the apparatus scrambles the PDU by using a group radio network temporary identifier (group radio network temporary identifier, G-RNTI), or scrambles downlink control information (downlink control information, DCI) corresponding to the PDU, and one or more apparatuses receive a same PDU based on a same G-RNTI. Alternatively, transmitting the PDU in the PTM transmission manner may refer to that a location of a same PDU is notified to a plurality of apparatuses in a semi-static manner, and the plurality of apparatuses may simultaneously receive the PDU. Alternatively, transmitting the PDU in the PTM transmission manner may refer to that the PDU is transmitted in a DRB established for multicast transmission or transmitted in a channel specially designed for multicast.

Receiving in the PTM manner means that when the PTM transmission manner is used for sending, one of a plurality of receiving apparatuses receives the PDU based on the G-RNTI; or one of a plurality of receiving apparatuses receives the PDU through a DRB established for multicast transmission or receives the PDU on a channel used for multicast transmission.

It should be understood that in this application, multicast is a specific manner of multicast. Therefore, the multicast may also be referred to as the multicast.

Sending in a PTP transmission manner means that when an apparatus sends a TB corresponding to the PDU, the apparatus scrambles the PDU by using a cell radio network temporary identifier (cell network temporary identifier, C-RNTI), or scrambles DCI corresponding to the PDU, and only one apparatus receives a same PDU based on the C-RNTI. Alternatively, transmitting the PDU in a PTP transmission manner may refer to that the PDU is transmitted in a DRB established for unicast or transmitted on a channel specially designed for unicast.

Receiving in the PTP manner means that when sending is performed in the PTP transmission manner, a receiving apparatus receives the PDU based on the C-RNTI; or an apparatus receives the PDU through a DRB established for unicast transmission or receives the PDU on a channel used for unicast transmission.

Figure 3:
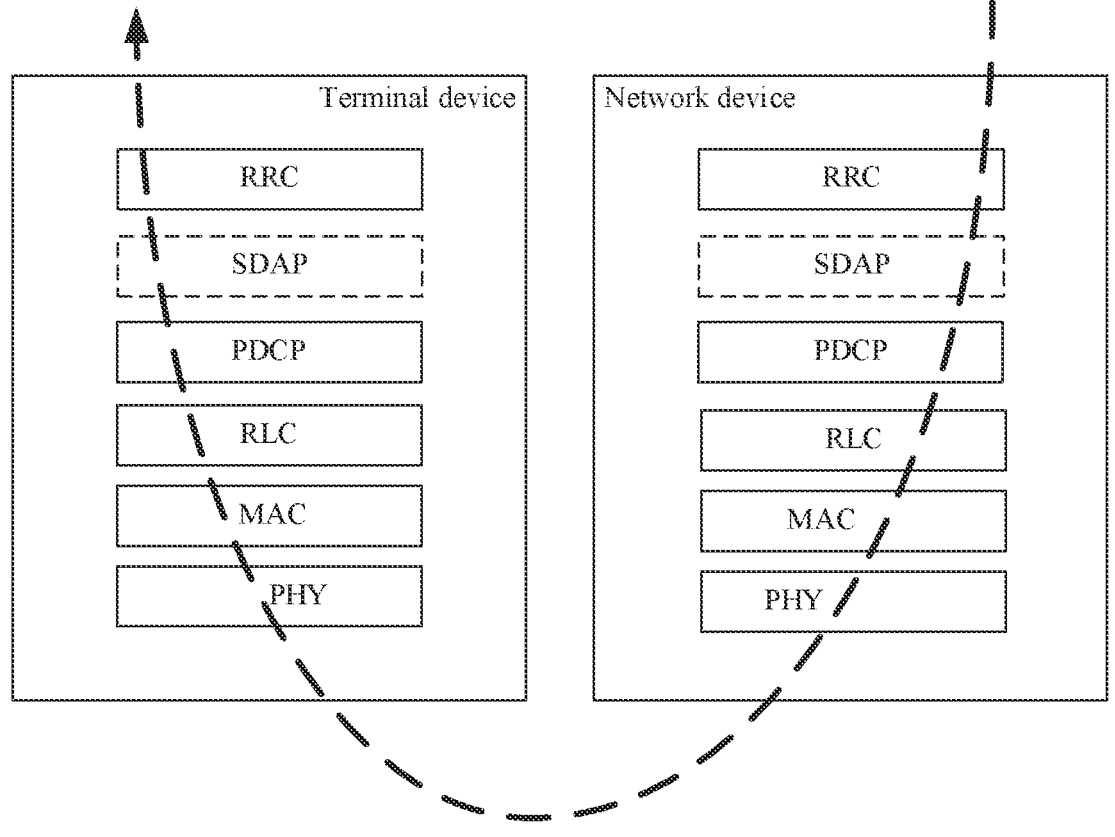
FIG. 3 is a schematic diagram of a communication protocol stack architecture.

The network device and the terminal device shown in FIG. 1 may separately have a specific protocol stack structure, to communicate with each other. FIG. 3 is a schematic diagram of a protocol stack structure of a network device and a terminal device. In FIG. 3, a dashed line indicates that data is sent from the network device to the terminal device. It may be understood that this is merely an example, and a data transmission direction may also be from the terminal device to the network device. As shown in FIG. 3, for example, a control plane protocol stack structure may include a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, a physical layer, or the like. The physical layer is located at a lowest layer (layer 1), the MAC layer, the RLC layer, the PDCP layer, and the SDAP layer belong to a second layer (layer 2), and the RRC layer belongs to a third layer (layer 3).

Data of the MBS first arrives at the PDCP layer of the network device, is processed by the PDCP layer of the network device, and then is transmitted to the RLC layer and the MAC layer. After being processed, the data is sent from the physical layer, and is transmitted to the terminal device through an air interface. Then, each protocol layer on a terminal device side sequentially performs corresponding processing on the data packet based on processing order opposite to processing order of the network device. On a network device side and the terminal device side, processing on the data packet at each layer may be combined to be referred to as the DRB. Each piece of data in the DRB needs to be processed at each layer, and each layer has a corresponding functional entity to perform a corresponding function, for example, a PDCP entity at the PDCP layer.

Each DRB configuration includes one PDCP entity, the DRB configuration is associated with at least one RLC entity, and each RLC entity corresponds to one logical channel. The SDAP layer may further exist above the PDCP entity, and the SDAP layer is responsible for mapping data from the core network to different bearers.

A specific data example is as follows: Before original data is transmitted at the physical layer, processing on the SDAP layer, the PDCP layer, the RLC layer, and the MAC layer needs to be performed, and a packet header of a corresponding protocol layer needs to be added. Certainly, packet headers of a part of layers are optional. For example, both the SDAP layer and the RLC layer have a transmission manner in which no packet header is added. The PDCP PDU, the SDAP PDU, and an original data packet are generally in a one-to-one correspondence. The RLC may segment one PDCP data packet, and the MAC layer may cascade a plurality of RLC data packets.

Figure 4:
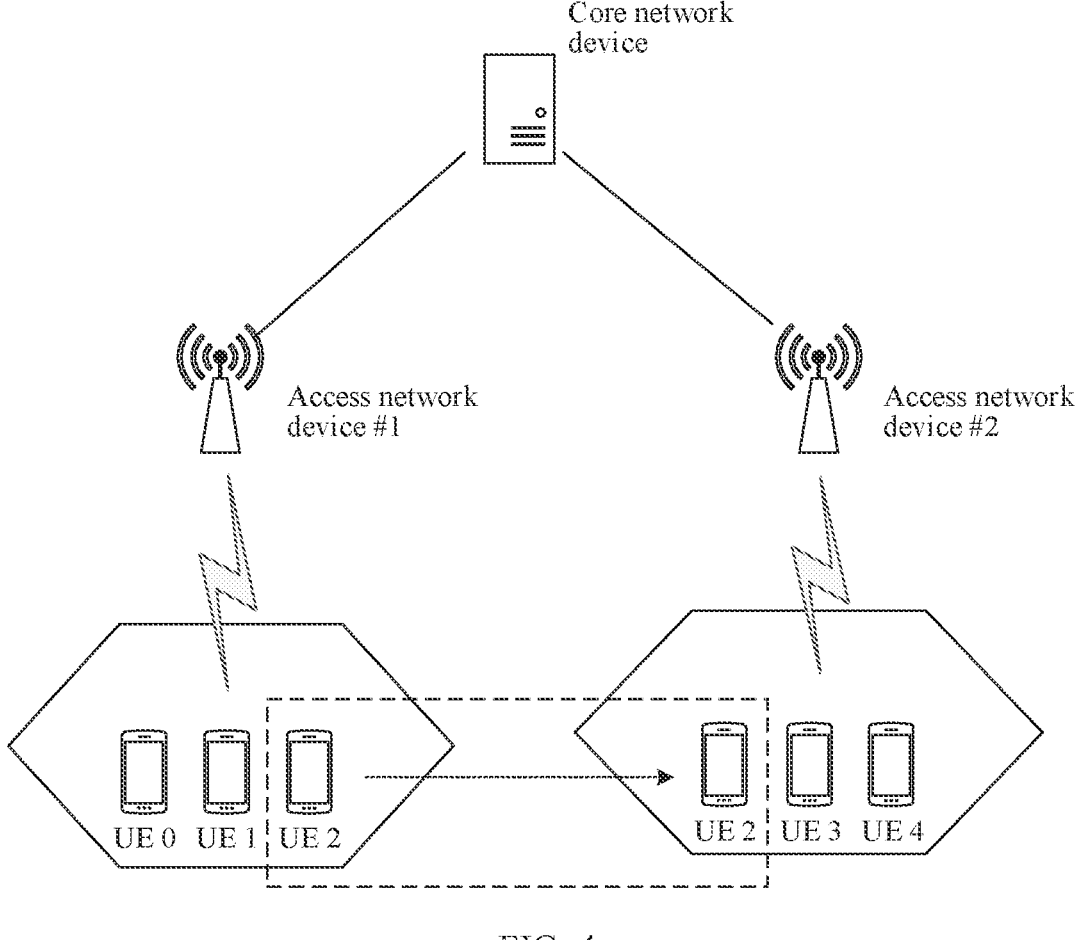
FIG. 4 is a schematic diagram of an architecture of another communication system according to an embodiment of this application.

As shown in FIG. 4, in an embodiment scenario provided in embodiments of this application, the UE (UE 2 shown in FIG. 4) may be handed over from a source gNB (source gNB, SgNB) (or referred to as a source gNB) to a target gNB (target gNB, TgNB) (or referred to as a target gNB) through handover (handover).

In a wireless communication system, each cell covers only a limited range. Therefore, when the UE moves from a current serving cell to a neighboring cell, to ensure continuity of a service, a network side needs to hand over the service to the neighboring cell, so that a communication process is not interrupted. In short, the handover refers to a process in which a link carrying communication data is handed over from a cell (or an access network device) to another cell (or an access network device) in a mobile communication process to ensure that communication is not interrupted.

Figure 5:
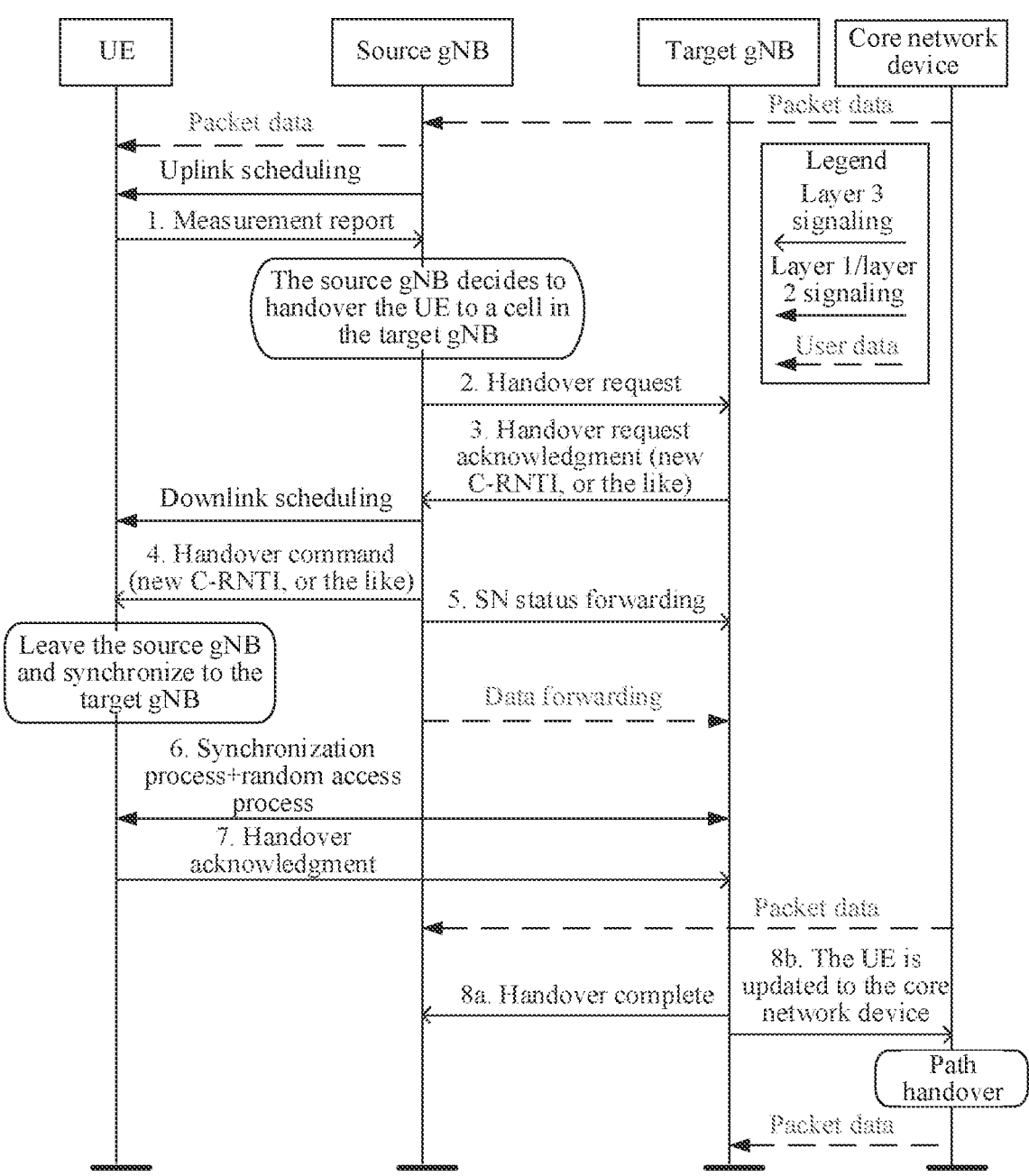
FIG. 5 is a schematic flowchart of UE handover.

A scenario in which the UE 2 is handed over from the SgNB (an access network device #1) to the TgNB (an access network device #2) shown in FIG. 4 is used as an example. An example of the handover is shown in FIG. 5. A handover procedure in the example is a handover process initiated by the SgNB. A main process of the handover procedure includes: The SgNB determines, based on a measurement report reported by the UE 2, to hand over the UE 2, and initiates a handover request to the TgNB. After the SgNB obtains a handover acknowledgment of the TgNB, the SgNB sends a handover command to the UE 2. After the UE 2 receives the handover command, the UE 2 stops sending uplink or downlink data to the SgNB, and the UE 2 starts to synchronize with the TgNB, and initiates a random access process. When sending the handover command to the UE 2, the SgNB stops uplink or downlink data transmission with the UE 2, and sends data stored in the SgNB to the TgNB. After successfully accessing the TgNB, the UE 2 starts to transmit the uplink or downlink data with the TgNB.

A specific procedure includes the following steps.

1. In a handover preparation phase, the UE 2 in an RRC connected mode sends the measurement report (measurement report) based on a measurement reporting triggering criteria configured by the SgNB.

2. When the UE 2 meets a handover condition, the SgNB determines the TgNB for the UE 2 based on the measurement report of the UE 2 and an RRM algorithm, and sends context (UE context) information of the UE 2 to the TgNB with the handover request.

3. The TgNB prepares for the UE 2 to be handed over, simultaneously allocates the C-RNTI and other parameters to the UE 2, and returns the C-RNTI and other parameters to the SgNB in a handover request acknowledgment message. After receiving the handover request acknowledgment message, the SgNB prepares to forward packet data to the TgNB.

4. The SgNB sends the handover command (handover command) to the UE 2 (the handover command includes the following information: a new C-RNTI, a SIB of the TgNB, and configuration information of the UE 2, such as configurations of the MAC layer, the RLC layer, and the PDCP layer), and after receiving the handover command, the UE 2 stops uplink or downlink data transmission with the SgNB, and synchronizes with the TgNB.

In this case, the SgNB forwards, to the TgNB, buffered uplink data sent by the UE 2 and buffered downlink data sent by the UPF.

5. The SgNB sends SN status information to the TgNB.

6. After disconnecting data transmission from the SgNB, the UE 2 starts a downlink synchronization process with the TgNB, and then initiates the random access process to obtain uplink timing and uplink resource allocation. The TgNB sends the TA to the UE 2 and indicates, to the UE 2, resources allocated to the TgNB. The information is used by the UE 2 to send an RRC connection reconfiguration complete message to the TgNB, to indicate that the handover is completed.

7. The UE 2 sends "handover acknowledgment" information to the TgNB, to indicate that the handover is completed.

8. The TgNB indicates, to the SgNB, that the handover is completed, so that the SgNB releases context information of the UE 2.

In addition, the TgNB notifies the core network node to update information of a target gNB to forward data, so that the core network may send the data of the UE 2 to the TgNB.

Based on the procedure shown in FIG. 5, the UE 2 may be handed over from the access network device #1 to the access network device #2. However, currently, PDCP SNs of data packets of the MBS service transmitted by the access network device to the UE are respectively determined by the access network device. In other words, even if both the access network device #1 and the access network device #2 transmit a same data packet of the MBS service, the access network device #1 and the access network device #2 also set different PDCP SNs for the data packet of the same MBS service. Therefore, after the UE 2 is handed over from the access network device #1 to the access network device #2, the UE 2 cannot continue to receive, based on the PDCP SN of the data packet originally received in the access network device #1, a data packet after the PDCP SN. As a result, the data packet is lost or the MBS service is interrupted.

To improve continuity of the MBS service in the UE handover scenario, embodiments of this application provide a communication method. The communication method may be applied to the scenario shown in FIG. 1 or FIG. 4. The communication method may be implemented by the access network device and/or the core network device. The access network device includes at least one of the network device 102 shown in FIG. 1, the access network device #1, or the access network device #2 shown in FIG. 4. The core network device is the core network device shown in FIG. 1 or FIG. 4.

The following describes possible structures of the access network device and the core network device with reference to the accompanying drawings.

Figure 6:
FIG. 6 is a schematic diagram of a structure of a communication apparatus according to an embodiment of this application.

For example, FIG. 6 is a possible schematic diagram of a structure of an access network device. The structure may include a processing module 610 and a transceiver module 620. For example, the structure shown in FIG. 6 may be the access network device, or may be a chip applied to the access network device, or another combined device or component (or referred to as a component) that has a function of the access network device in this application. When the structure is the access network device, the transceiver module 620 may include a transceiver and/or a communication interface. The transceiver may include an antenna, a radio frequency circuit, or the like. The communication interface, for example, an optical fiber interface, may support wired communication between the access network device and the core network device. The processing module 610 may be a processor, for example, a baseband processor. The baseband processor may include one or more central processing units (central processing unit, CPU). When the structure is a component having a function of the access network device shown in this application, the transceiver module 620 may be a radio frequency unit, and the processing module 610 may be a processor, for example, the baseband processor. When the structure is a chip system, the transceiver module 620 may be an input/output interface of a chip (for example, a baseband chip), and the processing module 610 may be a processor of the chip system, and may include one or more central processing units. It should be understood that the processing module 610 in this embodiment of this application may be implemented by using a processor or a processor-related circuit component, and the transceiver module 620 may be implemented by using a transceiver or a transceiver-related circuit component.

For example, the processing module 610 may be configured to perform all operations, such as a processing operation, except a receiving and sending operation, performed by the access network device in any embodiment of this application, and/or configured to support another process of the technology described in this specification, for example, generate a message, information, and/or signaling sent by the transceiver module 620, and process a message, information, and/or signaling received by the transceiver module 620. The transceiver module 620 may be configured to perform all receiving and sending operations performed by the access network device in any embodiment of this application, and/or support another process of the technology described in this specification.

In addition, the structure shown in FIG. 6 may be further configured to implement the terminal device or a component in the terminal device. For example, the processing module 610 may be configured to perform all operations, such as a processing operation, except a receiving and sending operation, performed by the terminal device in any embodiment of this application, and/or configured to support another process of the technology described in this specification, for example, generate a message, information, and/or signaling sent by the transceiver module 620, and process a message, information, and/or signaling received by the transceiver module 620. The transceiver module 620 may be configured to perform all receiving and sending operations performed by the terminal device in any embodiment of this application, and/or support another process of the technology described in this specification.

In addition, the transceiver module 620 may be a function module, and the function module may complete both a sending operation and a receiving operation. For example, the transceiver module 620 may be configured to perform all sending operations and receiving operations performed by the access network device or the terminal device. For example, when the sending operation is performed, the transceiver module 620 may be considered as a sending module, and when the receiving operation is performed, the transceiver module 620 may be considered as a receiving module. Alternatively, the transceiver module 620 may be two function modules. The transceiver module 620 may be considered as a general term of the two function modules. The two function modules are a sending module and a receiving module. The sending module is configured to complete the sending operation. For example, the sending module may be configured to perform all sending operations performed by the access network device or the terminal device, the receiving module is configured to complete the receiving operation, and the receiving module may be configured to perform all receiving operations performed by the access network device or the terminal device.

Figure 7:
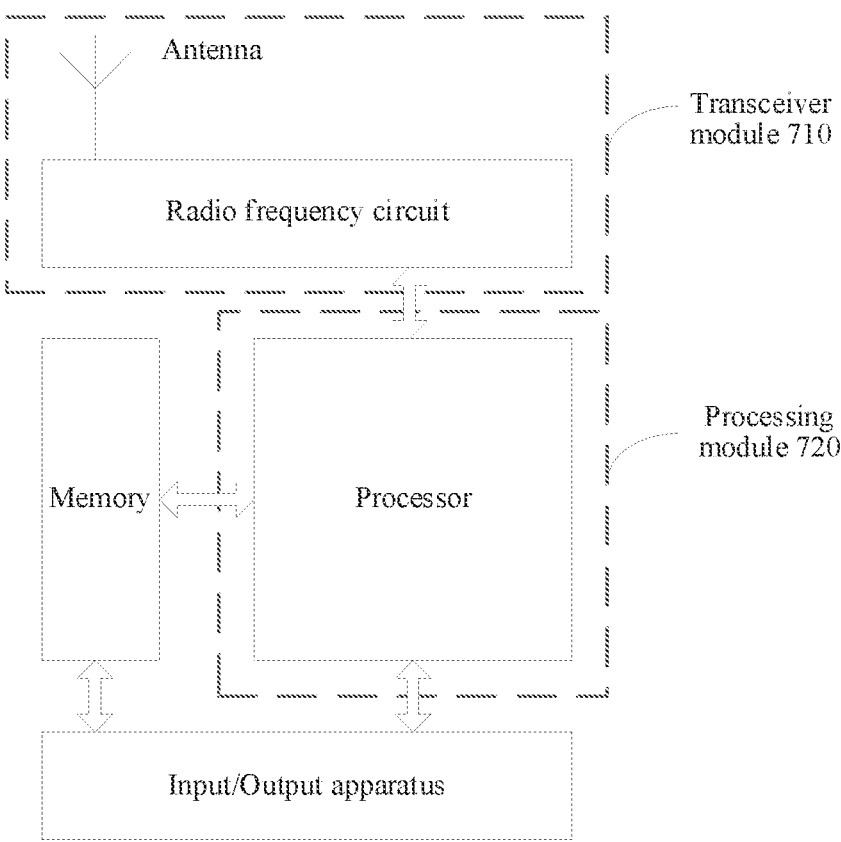
FIG. 7 is a schematic diagram of a structure of another communication apparatus according to an embodiment of this application.

FIG. 7 is a schematic diagram of a structure of another access network device. As shown in FIG. 7, the access network device includes a structure such as a processor, a memory, a radio frequency unit (or a radio frequency circuit), or an antenna. The processor is mainly configured to process a communication protocol and communication data, control a network device, execute a software program, process data of the software program, and the like. The memory is mainly configured to store the software program and data. A radio frequency unit is mainly configured to perform conversion between a baseband signal and a radio frequency signal and process the radio frequency signal.

As shown in FIG. 7, the access network device may include a transceiver module 710 and a processing module 720. The transceiver module may include a sending module and a receiving module, or the transceiver module 710 may be a module that may implement a sending function and a receiving function. The transceiver module 710 may correspond to the transceiver module 620 in FIG. 6, that is, the transceiver module 620 may be implemented by the transceiver module 710. The processing module 720 may correspond to the processing module 610 in FIG. 6, that is, the processing module 720 may perform an action performed by the processing module 610. It should be understood that the access network device may further include a communication interface, configured to communicate with a core network device as required.

Optionally, the transceiver module 710 may further be referred to as a transceiver, a transceiver circuit, a transceiver, or the like, and may include at least one antenna or a radio frequency unit. The transceiver module 710 is mainly configured to send and receive a radio frequency signal, and perform conversion between the radio frequency signal and a baseband signal. The processing module 720 is mainly configured to perform baseband processing, control the access network device, or the like. The transceiver module 710 and the processing module 720 may be physically disposed together, or may be physically disposed separately, that is, a distributed base station.

For example, the transceiver module 710 may include one or more radio frequency units, for example, a remote radio unit (remote radio unit, RRU), and the processing module 720 may include one or more baseband units (baseband unit, BBU) (which may also be referred to as a digital unit, digital unit, DU).

In an example, the processing module 720 may include one or more boards, and a plurality of boards may jointly support a radio access network (for example, an LTE network) of a single access standard, or may separately support radio access networks (for example, an LTE network, a 5G network, or another network) of different access standards. The processing module 720 further includes a memory and a processor. The memory is configured to store necessary instructions and necessary data. The processor is configured to control the access network device to perform a necessary action. For example, the processor is configured to control the access network device to perform an operation procedure related to the access network device in embodiments of this application. The memory and the processor may serve one or more boards. In other words, a memory and a processor may be disposed on each board. Alternatively, a plurality of boards may share a same memory and a same processor. In addition, a necessary circuit may further be disposed on each board.

In addition, the structure shown in FIG. 7 may be further configured to implement the terminal device or a component in the terminal device. For example, the processing module 720 may be configured to perform all operations, such as a processing operation, performed by the terminal device in any embodiment of this application except a receiving and sending operation, and/or configured to support another process of the technology described in this specification, for example, generate a message, information, and/or signaling sent by the transceiver module 710, and process a message, information, and/or signaling received by the transceiver module 710. The transceiver module 710 may be configured to perform all receiving and sending operations performed by the terminal device in any embodiment of this application, and/or support another process of the technology described in this specification.

Figure 8:
FIG. 8 is a schematic diagram of a structure of another communication apparatus according to an embodiment of this application.

FIG. 8 is a schematic diagram of a structure of a core network device according to an embodiment of this application. The structure may include a processing module 810 and a transceiver module 820. For example, the structure may be the core network device that is shown, or may be a chip applied to the core network device, or another combined device or component that has a function of the core network device shown in this application. When the structure is a core network device, the transceiver module 820 may be a communication interface, the processing module 810 may be a processor, and the processor may include one or more CPUs. When the structure is a component having a function of the core network device shown in this application, the transceiver module 820 may be a communication interface, and the processing module 810 may be a CPU. When the structure is a chip system, the transceiver module 820 may be an input/output interface of a chip (for example, a baseband chip), and the processing module 810 may be a processor of the chip system, and may include one or more central processing units. It should be understood that the processing module 810 in this embodiment of this application may be implemented by using a processor or a processor-related circuit component, and the transceiver module 820 may be implemented by using a transceiver or a transceiver-related circuit component.

For example, the processing module 810 may be configured to perform all operations except a sending and receiving operation performed by the core network device in embodiments of this application, for example, generate a message, information, and/or signaling sent by the transceiver module 820, and/or process a message, information, and/or signaling received by the transceiver module 820, and/or another process used to support the technology described in this specification. The transceiver module 820 may be configured to perform all sending and/or receiving operations performed by the core network device in embodiments of this application, and/or configured to support another process of the technology described in this specification.

Figure 9:
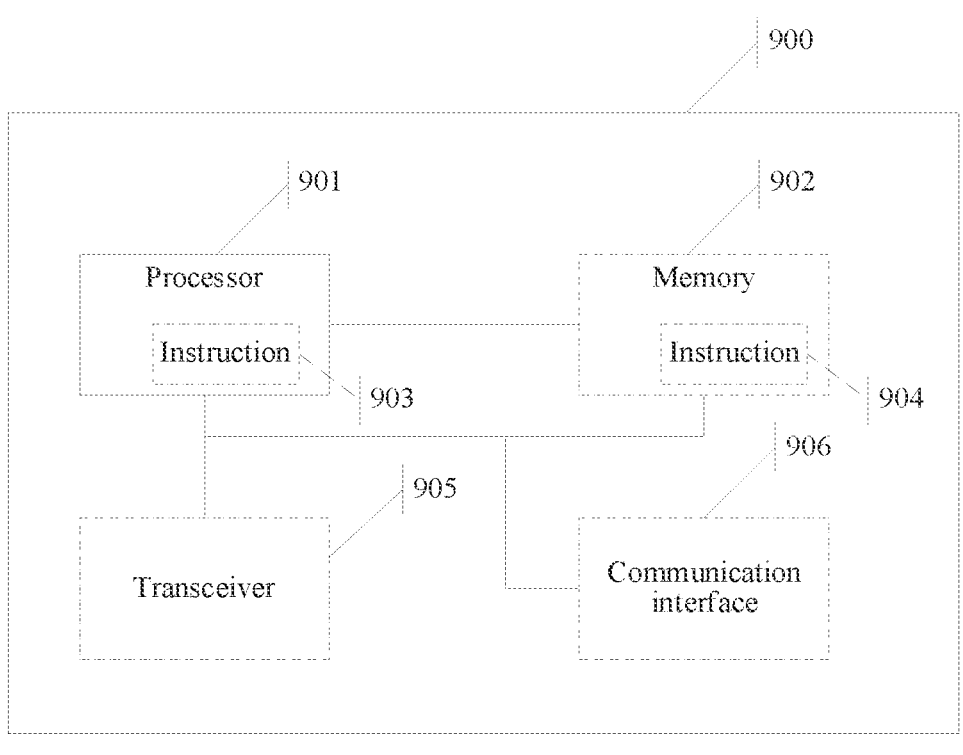
FIG. 9 is a schematic diagram of a structure of another communication apparatus according to an embodiment of this application.

FIG. 9 is a schematic diagram of a structure of another communication apparatus according to an embodiment of this application. The communication apparatus may be implemented by a hardware component. The apparatus 900 shown in FIG. 9 may be a core network device, or may be a chip, a chip system, a processor, or the like that supports the core network device in implementing the foregoing method. The apparatus 900 may include a module, a unit, or a means (means) corresponding to the steps described in embodiments of this application performed by the core network device. The function, the unit, or the means may be implemented by software, or may be implemented by hardware, or may be implemented by hardware executing corresponding software, or may be implemented in a manner of a combination of software and hardware. For details, refer to corresponding descriptions in the following embodiment.

Using a hardware implementation as an example, the apparatus 900 may include one or more processors 901, and the processor 901 may also be referred to as a processing unit, and may implement a specific control function. The processor 901 may be a general-purpose processor, a dedicated processor, or the like. For example, the processor 901 may be a baseband processor or a central processing unit. The baseband processor may be configured to process a communication protocol and communication data. The central processing unit may be configured to control a communication apparatus (for example, a base station, a baseband chip, a terminal, a terminal chip, a distributed unit, or a central unit), execute a software program, and process data of the software program.

In an optional design, the processor 901 may store instructions 903 and/or data, and the instructions 903 and/or the data may be run by the processor, so that the apparatus 900 performs the method described in embodiments of this application.

In another optional design, the processor 901 may include a transceiver unit configured to implement receiving and sending functions. For example, the transceiver unit may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 900 may include a circuit. The circuit may implement a sending, receiving, or communication function in embodiments of this application.

Optionally, the apparatus 900 may include one or more memories 902. The memory 902 may store instructions 904, and the instructions may be run on the processor, so that the apparatus 900 performs the method described in embodiments of this application. Optionally, the memory may further store data. Optionally, the processor may also store instructions and/or data. The processor and the memory may be disposed separately, or may be integrated together. For example, the correspondences described in embodiments of this application may be stored in the memory, or may be stored in the processor.

Optionally, the apparatus 900 may further include a transceiver 905 and/or a communication interface 906. The processor 901 may be referred to as a processing unit, and controls the apparatus 900. The transceiver 905 may be referred to as a transceiver unit, a transceiver machine, a transceiver circuit, a transceiver apparatus, a transceiver module, or the like, and is configured to implement a transceiver function. The communication interface 906 is, for example, a wireless transceiver, a transceiver circuit, an interface, or an interface circuit.

The processor 901 may correspond to the processing module 810 in FIG. 8, that is, the processor 901 may implement the processing module 810. The transceiver 905 and/or the communication interface 906 may correspond to the transceiver module 820 in FIG. 8, that is, the transceiver module 820 may be implemented by the transceiver 905 and/or the communication interface 906.

Figure 10:
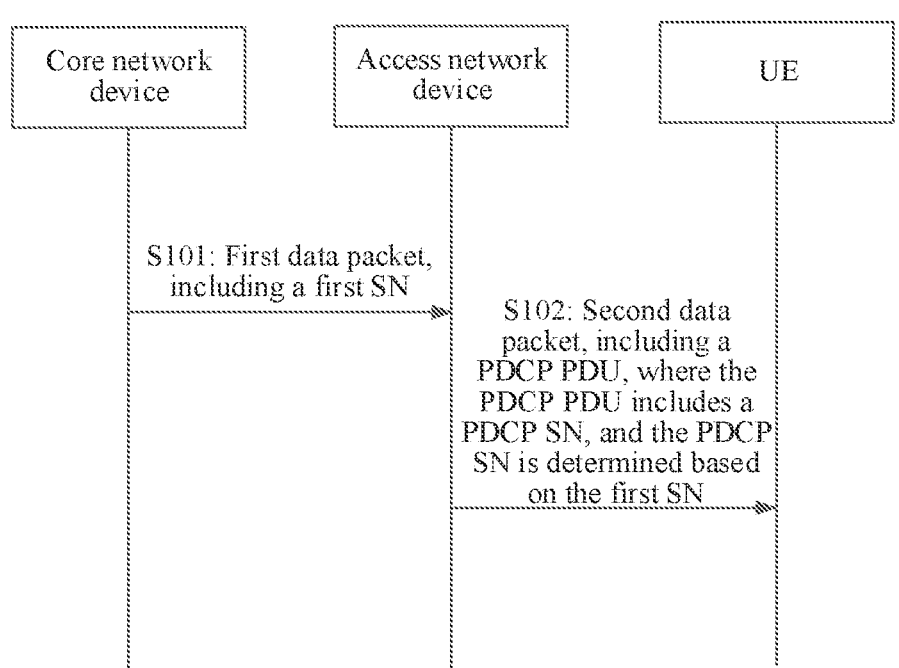
FIG. 10 is a schematic flowchart of a communication method according to an embodiment of this application.

As shown in FIG. 10, the communication method provided in embodiments of this application may include the following steps.

S101. An access network device receives a first data packet of a first session from a core network device, where the first data packet includes a first SN. The first session includes an MBS session.

It should be understood that the access network device herein may be a first access network device and/or a second access network device. For example, the first access network device is a source base station of UE in a UE handover scenario, and the second access network device is a target base station in the UE handover scenario. Alternatively, the second access network device is a source base station of UE in a UE handover scenario, and the first access network device is a target base station in the UE handover scenario.

For example, the access network device is the access network device #1 and/or the access network device #2 shown in FIG. 4. The core network device is, for example, the core network device shown in FIG. 4.

For example, the first data packet belongs to the first session (or referred to as a first MBS session) between the access network device and the core network device, and the first session includes at least one QoS flow (or the QoS flow may be replaced with an MBS flow).

For example, the first SN includes at least one of a GTP-U SN and a QFI SN in the first data packet or an SN (for example, an MBS SN or another name) carried in a newly defined field in a packet header in the first data packet.

S102. The access network device sends a second data packet to a terminal device, where the second data packet belongs to a data packet of a first DRB, the second data packet includes a PDCP PDU, the PDCP PDU is obtained based on the first data packet, and a PDCP SN of the PDCP PDU is determined based on the first SN.

The second data packet may be the PDCP PDU. Generally, the first data packet transmitted by the core network device to the access network device is used as a PDCP SDU, and after being processed by a PDCP entity, the first data packet becomes the second data packet after a PDCP packet header is added, that is, the PDCP PDU. Alternatively, the second data packet may be an RLC PDU, and the RLC PDU includes the PDCP PDU. The PDCP PDU is used as an RLC SDU, and becomes an RLC PDU after an RLC packet header is added. In this case, the PDCP SN of the PDCP PDU may also be referred to as a PDCP SN corresponding to the second data packet, or a PDCP SN of the RLC PDU corresponding to the second data packet. In addition, in this case, an RLC SN of the second data packet may also be determined based on the first SN.

According to the foregoing method, the access network device may determine, based on the first SN in the first data packet, the PDCP SN of the PDCP PDU corresponding to the first data packet. When different access network devices respectively determine PDCP SNs based on the first SN in the first data packet, the PDCP SNs determined by the different access network devices for data packets that are from the core network device and that have the same first SNs are consistent. In this way, when UE is handed over between the different access network devices, transmission progresses of MBS services of two access network devices may be determined based on transmission statuses of the PDCP SNs of the different access network devices, and further, a loss of data packets of the MBS services is avoided through a data forwarding mechanism. For example, if the two stations determine, based on a sending status of the PDCP SN, that a transmission progress of the source base station is faster, the source base station in which the UE is located before the handover may forward a part of data packets to the target base station in which the UE is located after the handover, and the target base station sends the part of data packets to the UE after the handover. This avoids a loss of the part of data packets.

The following uses an example to describe a manner in which the access network device determines the PDCP SN in the second data packet.

Manner 1. The access network device determines, based on a mapping relationship between a DRB and the MBS session or a QoS flow in the MBS session, a manner of setting the PDCP SN.

Optionally, the access network device autonomously determines how to map the MBS session or the QoS flow in the MBS session to the data DRB for transmission. Alternatively, the access network device may receive, from the core network device or another access network device, a correspondence between the DRB and the MBS session or the QoS flow in the MBS session.

In a possible example, when the MBS session to which the first data packet belongs is in a one-to-one correspondence with the DRB (or in other words, the MBS session is in a one-to-one correspondence with the DRB), the access network device may determine the PDCP SN in the second data packet based on the GTP-U SN in the first data packet. That the MBS session is in a one-to-one correspondence with the DRB means that all data packets of the MB S session are sent to the UE through the DRB, and a data packet of another MBS session is not transmitted through the DRB.

Figure 11:
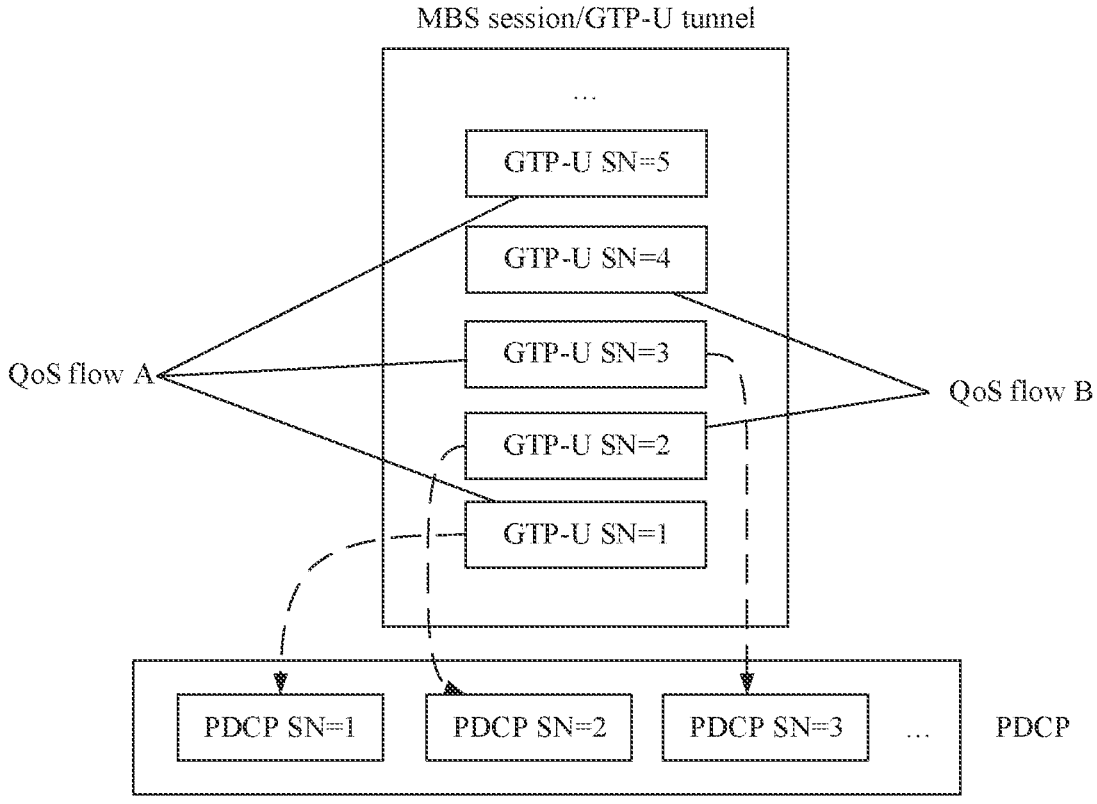
FIG. 11 is a schematic diagram of a forwarding manner of MBS service data of an access network device according to an embodiment of this application.

With reference to FIG. 11, the following describes a manner in which the access network device determines the PDCP SN of the PDCP PDU when the MBS session to which the first data packet belongs is in the one-to-one correspondence with the DRB.

After receiving a data packet of the MBS service from a server, when sending same first data packets (where the same data packets are data packets that have same content and/or sizes) to different access network devices (for example, the access network device #1 and the access network device #2 are different access network devices of each other), the core network device needs to include same GTP-U SNs in the first data packets sent to the two access network devices. After receiving the first data packets, the access network device #1 and the access network device #2 respectively set PDCP SNs based on the GTP-U SN.

The PDCP SN may be equal to the GTP-U SN, or there may be a fixed difference between the PDCP SN and the GTP-U SN. The difference may be specified in a protocol or indicated by another network device (the core network device or another access network device).

As shown in FIG. 11, a QoS flow A and a QoS flow B are transmitted through a same tunnel (or a GTP-U tunnel). To be specific, the QoS flow A and the QoS flow B belong to a same MBS session, and both the QoS flow A and the QoS flow B are mapped to a same DRB. In other words, all data packets of the MBS session are transmitted through the same DRB. In other words, the MBS session is in a one-to-one correspondence with the DRB. In this case, when determining a PDCP SN of a data packet transmitted through the tunnel, different access network devices may enable the PDCP SN and a GTP-U SN of the data packet in the tunnel to meet the following relationship:

PDCP SN=GTP-U SN+k1.

k1=0, ±1, ±2, ±3, or the like.

In another possible example, when the first QoS flow to which the first data packet belongs is in a one-to-one correspondence with the first DRB, the access network device may determine the PDCP SN in the second data packet based on the GTP-U SN in the first data packet. The first QoS flow may be one of at least one QoS flow not included in the first session. That the QoS flow is in a one-to-one correspondence with the DRB means that all data packets in the QoS flow are sent to the UE through the DRB corresponding to the QoS flow, and a data packet of a QoS flow other than the QoS flow in the session is not transmitted through the DRB.

Figure 12:
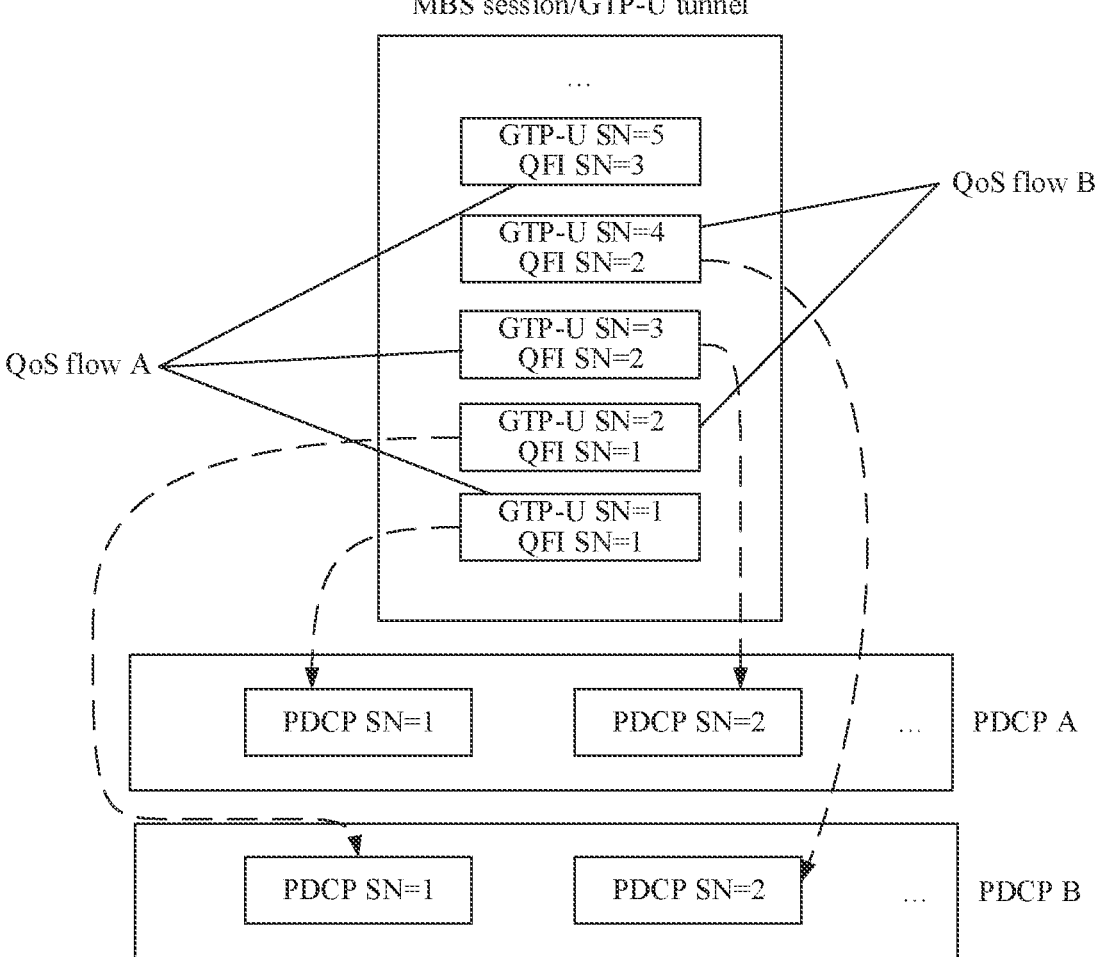
FIG. 12 is a schematic diagram of another forwarding manner of MBS service data of an access network device according to an embodiment of this application.

With reference to FIG. 12, the following describes a manner of determining the PDCP SN of the PDCP PDU when the QoS flow to which the first data packet belongs is in the one-to-one correspondence with the DRB.

After sending a data packet that is of the MBS service and that is received from a server, the core network device separately sends first data packets to the two access network devices through a QoS flow between the core network device and the access network device #1 and a QoS flow between the core network device and the access network device #2. The first data packets sent to the two access network devices carries same QFI SNs. In the access network device #1, the QoS flow to which the first data packet belongs is in a one-to-one correspondence with a DRB of the access network device #1, and in the access network device #2, the QoS flow to which the first data packet belongs is in a one-to-one correspondence with a DRB of the access network device #2.

After receiving the first data packets, the access network device #1 and the access network device #2 respectively set PDCP SNs of the corresponding data packets based on the QFI SN.

The PDCP SN may be equal to the QFI SN, or there may be a fixed difference between the PDCP SN and the QFI SN. The difference may be specified in a protocol or indicated by another network device (the core network device or another access network device).

As shown in FIG. 12, the access network device #1 is used as an example. A QoS flow A and a QoS flow B are transmitted through a unified tunnel, the QoS flow A is mapped to a DRB A (corresponding to a PDCP entity A) for transmission, and the QoS flow B is mapped to a DRB B (corresponding to a PDCP entity B) for transmission. In this case, when different access network devices determine a PDCP SN of a data packet transmitted in the QoS flow A or the QoS flow B, the PDCP SN and a QFI SN of the data packet may meet the following relationship:

PDCP SN=QFI SN+k2.

k2=0, ±1, ±2, ±3, or the like.

It should be understood that in Manner 1, a manner of mapping a session (or a QoS flow) of the access network device to the DRB may be that all QoS flows in the session correspond to one DRB (or the session is in a one-to-one correspondence with the DRB), or each QoS flow in the session is in a one-to-one correspondence with a DRB. This depends on implementation of the access network device. In other words, each access network device may autonomously determine a specific mapping manner for use. Optionally, a plurality of access network devices may exchange signaling or maintain a background operation administration and management (operation administration and maintenance, OAM), so that MBS sessions or QoS flows in different access network devices are mapped to the DRB in a same manner. An example in which the different access network devices include the access network device #1 and the access network device #2 is used. For example, that MBS sessions or QoS flows in different access network devices are mapped to the DRB in a same manner includes: An MBS session between the core network device to which the data packet of the MBS service belongs and the access network device #1 is in a one-to-one correspondence with one DRB, and in this case, an MBS session between the core network device to which a data packet that is the same as the data packet belongs and the access network device #2 is in a one-to-one correspondence with one DRB. Alternatively, a QoS flow between the core network device to which the data packet of the MBS service belongs and the access network device #1 is in a one-to-one correspondence with one DRB, and in this case, a QoS flow between the core network device to which a data packet that is the same as the data packet belongs and the access network device #2 is in a one-to-one correspondence with one DRB.

For example, in FIG. 4, the access network device #1 and the access network device #2 each set a one-to-one correspondence between a DRB A and a session including a QoS flow A, a QoS flow B, and a QoS flow C. In this case, after receiving a data packet in the QoS flow A, the QoS flow B, and/or the QoS flow C, the access network device #1 and the access network device #2 determine, based on a GTP-U SN of the data packet, a PDCP SN corresponding to the data packet. Alternatively, the access network device #1 and the access network device #2 each set a one-to-one correspondence between a QoS flow A and a DRB A. In this case, after receiving a data packet in the QoS flow A, the access network device #1 and the access network device #2 determine, based on a QFI SN of the data packet, a PDCP SN corresponding to the data packet.

If the SgNB and the TgNB use different mapping manners for a same session, the TgNB first establishes mapping from the session to a DRB in a mapping manner the same as a mapping manner of the SgNB, and then the UE is handed over from the SgNB to the TgNB. After completing a handover process, the UE receives, through a newly established DRB, a data packet forwarded by the SgNB to the TgNB; and receives, through a DRB that originally exists in the TgNB, a data packet sent by the core network to the TgNB.

Based on Manner 1, how the access network device sets the PDCP SN depends on how the access network device determines the mapping relationship between the session (or the QoS flow) and the DRB. If the access network device determines that the MBS session is in a one-to-one correspondence with the DRB, setting of the PDCP SN determines the PDCP SN in the manner in which the MBS session is in a one-to-one correspondence with the DRB described in Manner 1. If the access network device determines that some QoS flows in the MBS session are in a one-to-one correspondence with the DRB, setting of the PDCP SN determines the PDCP SN in a manner in which the QoS flow is in a one-to-one correspondence with the DRB described in Manner 1.

Manner 2. The access network device may report a mapping relationship between the session (or the QoS flow) and the DRB to the core network device. When sending the data packet to the access network device, the core network device determines the first SN of the data packet based on at least one of the QoS flow to which the data packet belongs, the session to which the data packet belongs, and the mapping relationship between the session (or the QoS flow) reported by the access network device and the DRB. The access network device determines, based on the first SN, the PDCP SN corresponding to the data packet.

In the manner, a mapping relationship between the session (or the QoS flow) determined by the access network device and the DRB is not limited, and the access network device only needs to report the mapping relationship to the core network device after determining the mapping relationship between the session (or the QoS flow) and the DRB. After learning the mapping relationship between the session (or the QoS flow) of the access network device and the DRB, the core network sets, based on sending sequence and a consecutive and ascending principle, first SNs corresponding to data packets of a plurality of QoS flows mapped to the same DRB.

For example, the access network device may send first information to the core network device, where the first information may indicate a mapping relationship between at least one QoS flow in the first session and at least one DRB, and the at least one DRB includes the first DRB to which the first data packet belongs. After receiving the first information, the core network device sequentially sets, in ascending order, the first SN of each data packet in the first session in ascending order of the GTP-U SNs in the data packet (or in order in which the core network device transmits the data packet), and then sends the data packet to the access network device. Using the first DRB as an example, the first SNs of the data packets in all the QoS flows corresponding to the first DRB are consecutively set. For example, in these data packets, the first SNs of the data packets are 1, 2, 3, or the like in ascending order of the GTP-Us.

Optionally, the access network device may send, to the core network as first information, identifiers or indexes of QoS flows mapped to the same DRB, that is, the first information indicates which QoS flows are mapped to a same DRB or first SNs need to be set for data packets of which QoS flows collectively; or may send, to the core network device as first information, identifiers or indexes of QoS flows mapped to the same DRB and identifiers or indexes of the DRBs. Optionally, the first information may be sent to the core network in an MBS session establishment process, a QoS flow establishment process, or an MBS flow establishment process.

For example, as shown in FIG. 13, the QoS flow A and the QoS flow C are mapped to the same DRB. The core network device may sequentially set the first SN in the data packet of the QoS flow A and the first SN in the data packet of the QoS flow C in ascending order starting from an initial value (for example, the initial value is 1) and in transmission order (or in other words, order of the GTP-U SN). However, for the QoS flow B, because the QoS flow B is separately mapped to one DRB (that is, mapped to the PDCP entity B), the core network device may start from the initial value (for example, the initial value is 1). The first SN in the data packet of the QoS flow B is sequentially set in ascending order and in transmission order (or order of the GTP-U SN). It should be understood that because the QoS flow A and the QoS flow C are mapped to the same DRB, the first SN of the data packet in the QoS flow A and the first SN of the data packet in the QoS flow C in the foregoing example need to be set together. However, because the QoS flow B is separately mapped to one DRB, setting of the first SN of the data packet in the QoS flow B is not affected by another QoS flow data packet, or the first SN of the data packet in the QoS flow B is independently set.

Optionally, the first SN may be a QFI SN or a newly defined SN.

For example, the newly defined SN may be referred to as an MBS SN. Using the MBS SN as an example, a new bit field may be expanded in a packet header format (for example, a GTP-U packet header format) of an existing core network data packet, to carry the MBS SN. In other words, the MBS SN may be carried in another expanded bit field other than an existing QFI SN field and a GTP-U SN field.

On the basis that the core network device sets the first SN of the data packet based on the mapping relationship between the session (or the QoS flow) and the DRB, the access network device may set the PDCP SN corresponding to the data packet based on the first SN. For example, the PDCP SN corresponding to the data packet and the first SN may meet the following relationship:

$$PDCP\ SN=First\ SN+k3.$$

k3=0, ±1, ±2, ±3, or the like.

Optionally, if the core network device does not receive the first information from the access network device, it is considered that the mapping relationship between the session (or the QoS flow) and the DRB is a default mapping manner. The default mapping manner may be determined in advance through information exchange, or may be specified in a protocol. Further, if the default mapping manner is that the session is in a one-to-one correspondence with the DRB, a default numbering manner of the first SN is that first SNs of data packets of all QoS flows in one session are uniformly numbered, and the access network device determines, based on the first SN of each data packet, the PDCP SN corresponding to the data packet. However, if the default mapping manner is that each QoS flow in the session is in a one-to-one correspondence with the DRB, the default numbering manner of the first SN is that the first SN of the data packet in each QoS flow in one session is independently numbered, and the access network device determines, based on the first SN of each data packet, the PDCP SN corresponding to the data packet.

Manner 3. The access network device consecutively sets, in ascending order (not necessarily consecutive) of sizes of the GTP-U SN of the received data packet, the PDCP SN corresponding to the data packet.

For example, when the first data packet belongs to the first session, and the first DRB corresponds to all or a part of the at least one QoS flow included in the first session, the first SN may include the GTP-U SN (referred to as a first GTP-U SN below) of the first data packet, and the first PDCP of the first data packet is represented as N0. In this case, the access network device may determine, based on the following method, a PDCP SN corresponding to at least one third data packet whose GTP-U SN is greater than the first GTP-U SN in the first session: determining that a PDCP SN corresponding to an $i^{th}$ third data packet in at least one third data packet that is sorted in a first order is N0+i, where the first order includes that the at least one third data packet is sorted in ascending order of included GTP-U SNs, and i is an integer greater than or equal to 0.

The mapping relationship between the session (or the QoS flow) and the DRB is not limited in the Manner 3. The session may be in a one-to-one correspondence with the DRB, or the QoS flow in the session may be in a one-to-one correspondence with the DRB, or may be in another corresponding manner.

For example, the QoS flow A, the QoS flow B, and the QoS flow C belong to a same MBS session, the QoS flow A and the QoS flow C are mapped to the same DRB (that is, mapped to the PDCP entity A), and the QoS flow B is mapped to another DRB (that is, mapped to the PDCP entity B). Therefore, GTP-U SNs of data packets transmitted to the PDCP entity A are not consecutive. For example, from a moment T0, GTP-U SNs of at least one data packet received by the PDCP entity A are 1, 3, 4, and 6. In other words, GTP-U SNs of at least one third data packet are 1, 3, 4, and 6. In this case, the GTP-U SNs may be arranged in ascending order, and PDCP SNs corresponding to corresponding data packets are set consecutively starting from N0+1, that is, PDCP SNs corresponding to data packets whose GTP-U SNs are 1, 3, 4, and 6 are respectively N0+1+k4, N0+2+k4, N0+3+k4, and N0+4+k4, where k4=0, ±1, ±2, ±3, or the like. N0 may be a value of a GTP-U SN of a last data packet received by the PDCP entity A before T0. The last data packet is, for example, the first data packet shown in this application.

It should be understood that if the PDCP entity A does not receive another data packet before the moment T0, a value of N0 is 0. N0 may alternatively be determined based on indication information of the core network or another access network device.

When Manner 3 is applicable to different access network devices, PDCP SNs set by different access network devices are the same for data packets of the same MBS service, to ensure data receiving continuity when the UE is handed over between different access network devices.

Based on Manner 3, it is assumed that either of the SgNB or the TgNB starts the MBS service first, and the other starts the service later, a case in which PDCP SNs of data packets are inconsistent may still occur, because PDCP SNs of first data packets sent by the two access network devices are inconsistent.

For example, the core network sends the first data packet of the first MBS service to the SgNB through the first session, and the SgNB determines that the PDCP SN (that is, the first PDCP SN) of the first data packet is N0, and the GTP-U SN of the first data packet is the first GTP-U SN. The TgNB starts to send the data packet of the first MBS service only after the SgNB sends the first data packet. For example, the first data packet sent by the TgNB is a next data packet of the first data packet sent by the core network (a GTP-U of the data packet is the first GTP-U SN+1). Using k4=0 as an example, based on a rule in Manner 3, the PDCP SN of the first data packet sent by the TgNB is 1 (that is, for the TgNB, N0=0), but a value of a PDCP SN corresponding to a next data packet of the first data packet sent by the SgNB is N0+1 (for the SgNB, NW, for example, if the first data packet is the first data packet received by the SgNB, N0=1). Therefore, PDCP SNs of the same data packet sent by the SgNB and the TgNB are inconsistent.

Still using an example in which the SgNB first sends the MBS service, and the TgNB then sends the MBS service, an optional solution is as follows: The SgNB or the core network sends second information to the TgNB, where the second information is used to indicate a correspondence (which may be referred to as a first correspondence) between the at least one PDCP SN and the at least one GTP-U SN. The first correspondence may include a correspondence between the GTP-U SN of the first data packet of the MBS service that is sent by the TgNB through the first DRB and the PDCP SN corresponding to the data packet. The PDCP SN may be determined by the SgNB based on the GTP-U SN of the data packet in Manner 3. In another optional solution, the SgNB or the core network sends, to the TgNB, the PDCP SN corresponding to the first data packet after the MBS session or the MBS flow is established.

The TgNB may receive the first correspondence or receive the PDCP SN corresponding to the first data packet, and determine the PDCP SN of the first sent data packet based on the first correspondence or the PDCP SN corresponding to the first data packet. Then, the TgNB determines a PDCP SN of a subsequent data packet in Manner 3. Therefore, after the TgNB starts to send the MBS service, PDCP SNs of same data packets sent by the SgNB and the TgNB are consistent.

Optionally, the first correspondence may include: the correspondence between the first PDCP SN (that is, N0) of the first data packet and the first GTP-U SN in the foregoing example; or a correspondence between N0+i and a GTP-U SN of an $i^{th}$ third data packet in at least one third data packet sorted in the first order, where N0+i is a PDCP SN of the $i^{th}$ third data packet received by the SgNB after the first data packet. Alternatively, a correspondence between N0+I+1 and M+1, where I is a quantity of the at least one third data packet, and M is a GTP-U SN of an $I^{th}$ third data packet in at least one third data packet sorted in the first order. It should be understood that M+1 may be the GTP-U SN of the data packet that is not received by the SgNB.

Optionally, the PDCP SN corresponding to the first data packet is, for example, N0, N0+i, or N0+I+1. In this case, the TgNB may determine, starting from the PDCP SN corresponding to the first data packet, the PDCP SN of the data packet sent to the terminal device through the same DRB.

Based on Manner 3, if a packet loss occurs in the data packet sent by the core network device to the access network device, PDCP SNs of same data packets determined by different access network devices based on Manner 3 are also inconsistent.

It is assumed that a packet loss occurs when the MBS data packet is transmitted from the core network to the access network device, which affects a determining rule of the PDCP SN shown in Manner 3. When a packet loss occurs in either of the SgNB or the TgNB, the PDCP SNs finally set for the same MBS data packets transmitted to the SgNB and the TgNB are different. For example, GTP-U SNs of data packets of the PDCP A transmitted to the SgNB are 1, 3, 4, and 6. In this case, the PDCP SN corresponding to the data packet whose GTP-U SN is 6 is 4, and GTP-U SNs of data packets of the PDCP A transmitted to the TgNB are 1, 3, and 6. In other words, the data packet whose GTP-U SN is 4 is lost. In this case, based on Manner 3, the GTP-U SN configures a value of the PDCP SN being 3 for the data packet whose GTP-U SN is 6. Consequently, a packet loss occurs after the UE is handed over from the SgNB to the TgNB due to inconsistent understanding.

To resolve the problem, the access network device may determine, based on a quantity of consecutively lost data packets in all the QoS flows corresponding to the DRB, a PDCP SN of a data packet with a smallest GTP-U SN after the consecutively lost data packets, to keep PDCP SNs of the data packets consecutive. The quantity of consecutively lost packets refers to adjacent lost data packets in all data packets of at least one QoS flow corresponding to the same DRB. For example, GTP-Us of data packets of all QoS flows corresponding to the same DRB are 1, 2, 4, and 6 respectively, but GTP-Us of data packets of all QoS flows corresponding to the DRB that are received by the access network device are 1 and 6 respectively. In this case, data packets whose GTP-Us are 2 and 4 are consecutively lost data packets, and the quantity of consecutively lost data packets is 2. If the GTP-Us of the data packets of all QoS flows corresponding to the DRB that are received by the access network device are 1, 2, and 6 respectively, the data packet whose GTP-U is 4 is a consecutively lost data packet, and the quantity of consecutively lost data packets is 1.

Details are as follows.

The access network device may identify, based on the QFI SN of the received data packet and the QFI SN of the previously received data packet in the QoS flow to which the data packet belongs, whether the packet loss occurs. In Manner 3, the core network device consecutively sets the QFI SN of the data packet in each QoS flow. If the QFI SN of the data packet in the same QoS flow received by the access network device is not consecutive, the access network device may determine to send the packet loss, and may determine a quantity N of consecutively lost data packets.

Further, the access network device may determine the GTP-U SN of the lost data packet based on the QFI SN of the lost data packet, obtain a correspondence between the GTP-U SN and the PDCP SN based on all data packets of all QoS flows that are the same as the DRB corresponding to the QoS flow to which the lost data packet belongs, and determine, based on the GTP-U SN of the lost data packet, the PDCP SN corresponding to the data packet whose GTP-U SN is greater than the GTP-U SN of the lost data packet.

For example, in the foregoing example, GTP-U SNs of data packets transmitted to the PDCP entity A of the TgNB are 1, 3, and 6. In this case, the TgNB may determine, based on the QFI SN of the received data packet, that the packet loss occurs, and a quantity of consecutively lost packets is represented as L. In the example, L=1.

When determining the PDCP SN corresponding to the data packet whose GTP-U SN is 6, the TgNB needs to consider the quantity L of consecutively lost packets. For example, in the data packet of the QoS flow received by the PDCP entity A, if the PDCP SN corresponding to the data packet before the lost data packet that is determined by the access network device in Manner 3 is N1, the access network device may determine that the PDCP SN corresponding to the first data packet received by the PDCP entity A after the packet loss is N1+L+1.

In addition, based on the solution shown in Manner 3, if the GTP-Us of the data packets received by the access network device are out of order, PDCP SNs determined by different access network devices for the same data packet sent by the core network device are different. To resolve the problem, when determining the PDCP SN corresponding to the data packet, the access network device is required to sort the data packets based on a size of the GTP-Us of the data packets, and determine, based on the sorted GTP-Us of the data packets, the PDCP SN corresponding to the data packet.

Values of K1, K2, K3, and/or K4 may be indicated by the core network device, or may be predefined values. Values of K1 are the same for different access network devices. Similarly, values of K2 are the same for different access network devices. Similarly, values of K3 are the same for different access network devices. Similarly, values of K4 are the same for different access network devices.

Embodiments of this application further provide another communication method, and the following specifically describes the method.

In many wireless communication scenarios, a terminal device needs to initiate a random access process to a network device, for example, entering a connected mode from an idle mode or an inactive mode, an RRC re-establishment process, or uplink out-of-synchronization (for more scenarios in which random access needs to be initiated, refer to a scenario in section 9.2.6 in the 3GPP protocol 38.300).

The random access process is classified into two types: four-step random access and two-step random access. Each of the two types of random access includes two random access manners: contention-based random access and non-contention-based random access.

The contention-based four-step random access is classified into the following steps: step 1, the terminal device sends a preamble to the network device through a physical random access resource in a message 1; after sending the preamble, the terminal device opens a random access response receiving window to receive a random access response sent by the network device; step 2, after receiving the preamble sent by the terminal device, the network device sends a message 2 to the terminal device, where the message 2 includes a random access response, and the random access response includes at least one piece of the following information: a preamble number, a timing adjustment amount, an uplink grant, or a temporary C-RNTI; step 3, the terminal device sends a message 3 on a corresponding uplink resource based on an indication in the message 2, where the message 3 may include at least one piece of the following information: an RRC reestablishment information request, an RRC establishment request, an RRC resume request, or the like, and after sending the message 3, the terminal device starts, by using a C-RNTI allocated in the random access response, a timer for detecting a conflict resolution message; and step 4, after receiving the message 3 sent by the terminal device, the network device sends a message 4, that is, a conflict resolution message. After receiving the conflict resolution message in an operating process of the timer, the terminal device considers that the random access succeeds. Otherwise, the terminal device returns to the first step to resend the message 1.

The non-contention-based four-step random access is classified into the following steps: step 1, the terminal device sends, to the network device through a physical random access resource in a message 1, a dedicated preamble allocated by a base station; after sending the dedicated preamble, the terminal device opens a random access response receiving window to receive a random access response sent by the network device; step 2, after receiving the preamble sent by the terminal device, the network device sends a message 2 to the terminal device, where the message 2 includes a random access response, and the random access response includes at least one piece of the following information: a preamble number, a timing adjustment amount, an uplink grant, or a temporary C-RNTI; and after receiving the random access response, the terminal device considers that random access succeeds.

The contention-based two-step random access is classified into the following steps: step 1, the terminal device sends a preamble to the network device through a physical random access resource in a message A, and sends load information to the network device through a physical uplink shared channel; after sending the message A, the terminal device opens a random access response receiving window to receive a random access response sent by the network device; step 2, after receiving the message A sent by the terminal device, the network device sends a message B to the terminal device, where the message B includes a random access response, and the random access response includes at least one piece of the following information: a preamble number, a timing adjustment amount, an uplink grant, or a temporary C-RNTI; after receiving the message B, the terminal device considers that the random access succeeds, if the terminal device receives a backoff indication in the message B, the terminal device returns to the four-step random access process, sends the message 3 to the network device through an uplink resource in the backoff indication, and monitors the conflict resolution message, and if conflict resolution fails, the terminal device returns to the first step to resend the message A.

The non-contention-based two-step random access is classified into the following steps: step 1, the terminal device sends a dedicated preamble to the network device through a physical random access resource in a message A, and sends load information to the network device through a dedicated physical uplink shared channel resource; after sending the message A, the terminal device opens a random access response receiving window to receive a random access response sent by the network device; step 2, after receiving the message A sent by the terminal device, the network device sends a message B to the terminal device, where the message B includes a random access response, and the random access response includes at least one piece of the following information: a preamble number, a timing adjustment amount, an uplink grant, or a temporary C-RNTI; after receiving the message B, the terminal device considers that the random access succeeds, if the terminal device receives a backoff indication in the message B, the terminal device falls back to the four-step random access process, sends the message 3 to the network device through an uplink resource in the backoff indication, and monitors a conflict resolution message, and if conflict resolution fails, the terminal device returns to the first step to resend the message A.

The foregoing describes the four-step random access and the two-step random access. When the UE needs to initiate random access, how to make a selection in the two-step random access and the four-step random access is a problem to be resolved herein. Especially in a non-terrestrial communication or satellite communication scenario, if how to make a selection is not specified, a case in which a large quantity of terminal devices use a same random access manner may occur, causing insufficient random access resources.

The communication method provided in embodiments of this application may include the following steps.

Step 1. An access network device sends first information to a terminal device, where the first information includes a first threshold or a first indication, and the first threshold or the first indication is used by the terminal device to determine whether to use a four-step random access process or a two-step random access process when initiating random access. In addition, the first threshold may not need to be sent by the access network device to the terminal device, but a fixed threshold is specified in a protocol. The first threshold may be a distance threshold, a time threshold, or a power threshold. The first information may be sent through broadcast system information or through RRC signaling. In addition, the first threshold may also be a fixed value.

Step 2. The terminal device receives first information, where the first information includes the first threshold or the first indication, and the first threshold is used by the terminal device to determine whether to use the four-step random access process or the two-step random access process when initiating the random access.

Step 3. When initiating the random access, the terminal device determines, based on the first information, whether to use the four-step random access process or the two-step random access process.

The details are as follows.

If the first information includes the first threshold, and the first threshold is the distance threshold, when a distance between the terminal device and the first network device and the first threshold meet a specific magnitude relationship, the terminal device may select the two-step random access, where the magnitude relationship may be that the distance is greater than the first threshold, equal to the first threshold, or less than the first threshold, and the first network device may be a satellite device, a forwarding device, or a relay device, or may be an access network device; if the first threshold is a time threshold, when an unidirectional propagation delay or a bidirectional propagation delay between the terminal device and the first network device meets a specific magnitude relationship with the first threshold, the terminal device may select the two-step random access, where the magnitude relationship may be that the unidirectional propagation delay or the bidirectional propagation delay is greater than the first threshold, equal to the first threshold, or less than the first threshold, and the first network device may be a satellite device, a forwarding device, or a relay device, or may be an access network device; and if the first threshold is the power threshold, when a maximum emitting power or a maximum available power of the terminal device is greater than the first threshold, the two-step random access may be used.

If the first information includes the first indication, the first indication is used to indicate which terminal devices use the two-step random access process and which terminal devices use the four-step random access process. The terminal device determines, based on the first indication and/or a first criterion, whether to use the four-step random access process or the two-step random access process. The first criterion may be a criterion divided based on a terminal device ID, a criterion divided based on a terminal device type, or a random criterion. In the criterion divided based on the terminal device ID, the terminal devices may be divided into two groups through parity of the terminal device ID. One group uses the two-step random access, and the other group uses the four-step random access. The first indication information may be used to dynamically change which two-step random access is used in the odd group and the even group. For example, the first indication information may indicate that the two-step random access is used for a terminal device whose ID is an odd number, or may indicate that the four-step random access is used for a terminal device whose ID is an odd number.

In a rule divided based on the terminal device type, a terminal device with a relatively high specification may preferentially use two-step random access. Specifically, which terminal device with a specific specification that may use the two-step random access process may be notified to the terminal device through a first indication or specified in a protocol. In the random rule, the access network device may send a first value to the terminal device in the first indication or the first threshold. The terminal device randomly generates a random number, compares the random number with the first value, and determines, based on a value relationship between the random number and the first value, whether to use the two-step random access or the four-step random access. For example, if the random number is less than the first value, the two-step random access process is used, or if the random number is greater than the first value, the two-step random access is used.

In addition, an SUL (Supplementary Uplink Carrier, supplementary uplink carrier) is introduced in 5G communication, that is, a new spectrum pairing manner, so that downlink data is transmitted on the C-band, and uplink data may be transmitted on the C-band or sub-3G (SUL, for example, 1.8 GHz), thereby improving uplink coverage. In this case, it is assumed that the terminal device initiates random access in a cell. How the terminal device determines whether to initiate random access on a non-SUL or initiate random access on the SUL, especially in the non-terrestrial communication or satellite communication scenario, if how to make a selection is not specified, a random access success rate of the terminal device is reduced.

The communication method provided in embodiments of this application may include the following steps.

Step 1. An access network device sends first information to a terminal device, where the first information includes a first threshold or a first indication, and the first threshold or the first indication is used by the terminal device to determine, when initiating random access, whether to initiate random access on a non-SUL carrier or initiate random access on an SUL carrier. In addition, the first threshold may not need to be sent by the access network device to the terminal device, but a fixed threshold is specified in a protocol. The first threshold may be a distance threshold, a time threshold, or a power threshold. In addition, the first threshold may also be a fixed value.

Step 2. The terminal device receives the first information, where the first information includes a first threshold or a first indication, and the first threshold is used by the terminal device to determine, when initiating the random access, whether to initiate the random access on the non-SUL carrier or initiate the random access on the SUL carrier.

Step 3. When initiating the random access, the terminal device determines, based on the first information, whether to initiate the random access on the non-SUL carrier or the SUL carrier when initiating the random access.

The details are as follows.

If the first information includes the first threshold, and the first threshold is the distance threshold, when a distance between the terminal device and the first network device and the first threshold meet a specific magnitude relationship, the terminal device may select to initiate random access on the non-SUL carrier, where the magnitude relationship may be that the distance is greater than the first threshold, equal to the first threshold, less than the first threshold, and the first network device may be a satellite device, a forwarding device, or a relay device, or may be an access network device; if the first threshold is the time threshold, when an unidirectional propagation delay or a bidirectional propagation delay between the terminal device and the first network device meets a specific magnitude relationship with the first threshold, the terminal device may select to initiate the random access on the non-SUL carrier, where the magnitude relationship may be that the unidirectional propagation delay or the bidirectional propagation delay is greater than the first threshold, equal to the first threshold, or less than the first threshold, and the first network device may be a satellite device, a forwarding device, or a relay device, or may be an access network device; and if the first threshold is the power threshold, when a maximum emitting power or maximum available power of the terminal device is greater than or less than the first threshold, the random access may be initiated on the non-SUL carrier.

If the first information includes the first indication, the first indication is used to indicate which terminal devices initiate the random access on the non-SUL carrier and which terminal devices initiate the random access on the SUL carrier. The terminal device determines, based on the first indication and/or the first criterion, whether to initiate the random access on the non-SUL carrier or initiate the random access on the SUL carrier. The first criterion may be a criterion divided based on a terminal device ID, a criterion divided based on a terminal device type, a criterion divided based on performance, or a random criterion. In the criterion divided based on the terminal device ID, the terminal devices may be divided into two groups through parity of the terminal device ID. One group initiates the random access on the non-SUL carrier, and the other group initiates the random access on the SUL carrier. The first indication information may be used to dynamically change which one of the odd group and the even group initiates the random access on the non-SUL carrier. For example, the first indication information may indicate that a terminal device whose ID is an odd number initiates the random access on the non-SUL carrier, or may indicate that a terminal device whose ID is an odd number initiates the random access on the SUL carrier.

In the rule divided based on the terminal device type, a terminal device with a relatively high specification may preferentially initiate random access on a non-SUL carrier or an SUL carrier. Specifically, which terminal device with a specification that may initiate random access on a non-SUL carrier may be notified to the terminal device through a first indication, or may be specified in a protocol in a random rule. The access network device may send a first value to the terminal device in the first indication or the first threshold. The terminal device randomly generates a random number, compares the random number with the first value, and determines, based on a value relationship between the non-SUL carrier and the SUL carrier, whether to initiate the random access on the non-SUL carrier or initiate the random access on the SUL carrier. For example, if the random number is less than the first value, the random access is initiated on the non-SUL carrier, or if the random number is greater than the first value, the random access is initiated on the non-SUL carrier.

As described above, when determining to initiate the contention-based random access, the terminal device selects a preamble and sends the preamble in the message 1. Currently, each cell has 64 available preambles, and the UE selects one of the preambles and transmits the preamble in the message 1. These preambles are divided into two parts: one part is used for the contention-based random access, and the other part is used for the non-contention-based random access. Preambles used for the contention-based random access may be further divided into two groups: a group A and a group B. When the contention-based random access is initiated, how the terminal device determines which group of preambles to be selected, especially in the non-terrestrial communication or satellite communication scenario, if how to make a selectionF is not specified, a case in which a large quantity of terminal devices use a same group of preambles may occur, resulting in an excessively high probability of conflicts.

The communication method provided in embodiments of this application may include the following steps.

Step 1. An access network device sends first information to a terminal device, where the first information includes a first threshold or a first indication, and the first threshold or the first indication is used by the terminal device to determine, when initiating random access, whether to initiate random access on a non-SUL carrier or initiate random access on an SUL carrier. In addition, the first threshold may not need to be sent by the access network device to the terminal device, but a fixed threshold is specified in a protocol. The first threshold may be the distance threshold, the time threshold, the power threshold, or a message size threshold. In addition, the first threshold may also be a fixed value.

Step 2. The terminal device receives the first information, where the first information includes the first threshold or the first indication, and the first threshold is used by the terminal device to determine which group of preambles to be used when initiating the random access.

Step 3. When initiating the random access, the terminal device determines, based on the first information, which group of preambles to be used.

The details are as follows.

If the first information includes the first threshold, and the first threshold is the distance threshold, when a distance between the terminal device and the first network device and the first threshold meet a specific magnitude relationship, the terminal device may select a preamble in the group A, where the magnitude relationship may be that the distance is greater than the first threshold, equal to the first threshold, or less than the first threshold, and the first network device may be a satellite device, a forwarding device, or a relay device, or may be an access network device; if the first threshold is the time threshold, when an unidirectional propagation delay or a bidirectional propagation delay between the terminal device and the first network device meets a specific magnitude relationship with the first threshold, the terminal device may select a preamble in the group A, where the magnitude relationship may be that the unidirectional propagation delay or the bidirectional propagation delay is greater than the first threshold, equal to the first threshold, or less than the first threshold, and the first network device may be a satellite device, a forwarding device, or a relay device, or may be an access network device; if the first threshold is the power threshold, when a maximum emitting power or a maximum available power of the terminal device is greater than or less than the first threshold, the preamble in the group A may be selected; and if the first threshold is an information size threshold, when a size of the message 3 to be sent by the terminal device is greater than the first threshold, a preamble in the group B may be selected.

If the first information includes the first indication, the first indication is used to indicate which terminal devices may select the preamble in the group A, and which terminal devices may select the preamble in the group B. The terminal device determines, based on the first indication and/or the first criterion, whether to select the preamble in the group A or the preamble in the group B. The first criterion may be a criterion divided based on a terminal device ID, a criterion divided based on a terminal device type, a criterion divided based on performance, or a random criterion. In the criterion divided based on the terminal device ID, the terminal devices may be divided into two groups through parity of the terminal device ID. One group selects the preamble in the group A, and the other group selects the preamble in the group B. The first indication information may be used to dynamically change the preamble in the group A selected by which one of the odd group and the even group. For example, the first indication information may indicate that a terminal device whose ID is an odd number selects the preamble in the group A, or may indicate that a terminal device whose ID is an odd number selects the preamble in the group B.

In the rule divided based on the terminal device type, a terminal device with a relatively high specification may preferentially select the preamble in the group B or select the preamble in the group A. Because the message 3 sent by the terminal device with a relatively high specification may be relatively large or a required access delay is lower, which terminal device with a specific specification that may select the preamble in the group A may be notified to the terminal device through the first indication, or may be specified in a protocol in a random rule. The access network device may send a first value to the terminal device in the first indication or the first threshold. The terminal device randomly generates a random number, compares the random number with the first value, and determines, based on a value relationship between the random number and the first value, whether to select the preamble in the group A or the preamble in the group B. For example, if the random number is less than the first value, the terminal device selects the preamble in the group A, or if the random number is greater than the first value, the terminal device selects the preamble in the group A.

Based on a same inventive concept, embodiments of this application further provide a communication apparatus, configured to implement the foregoing functions implemented by the terminal device, the access network device, and/or the core network device. The apparatus may include the structure shown in FIG. 6 to FIG. 9.

Embodiments of this application provide a communication system. The communication system may include the access network device and the core network device in the foregoing embodiments. Optionally, the communication system may include the structure shown in FIG. 1 or FIG. 4. The communication apparatus may be configured to implement steps implemented by the access network device and/or the core network device in the communication method shown in FIG. 10.

Embodiments of this application further provide a computer-readable storage medium. The computer-readable storage medium is configured to store a computer program. When the computer program is executed by a computer, the computer may implement the procedure related to the access network device and/or the core network device in the embodiment shown in FIG. 10 provided in the foregoing method embodiment.

Embodiments of this application further provide a computer program product. The computer program product is configured to store a computer program. When the computer program is executed by a computer, the computer may implement a procedure related to the access network device and/or the core network device in the embodiment shown in FIG. 10 provided in the foregoing method embodiment.

Embodiments of this application further provide a chip or a chip system (or a circuit). The chip may include a processor. The processor may be configured to invoke a program or instructions in a memory, to perform the procedure related to the access network device and/or the core network device in the embodiment shown in FIG. 10 provided in the foregoing method embodiment. The chip system may include the chip, and may further include another component such as a memory or a transceiver.

It should be understood that the processor mentioned in embodiments of this application may be a CPU, or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate, a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, appa-ratus, and unit, refer to a corresponding process in the foregoing method embodiments. Details are not described herein again.

In the several embodiments provided in this application, it should be understood that the disclosed communication method and communication apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. All or a part of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part making contributions, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing computer-readable storage medium may be any usable medium that can be accessed by a computer. By way of example but not limitation, the computer-readable medium may include a random access memory (random access memory, RAM), a read-only memory (read-only memory, ROM), an electrically erasable programmable read only memory (electrically erasable programmable read only memory, EEPROM), a compact disc read-only memory (compact disc read-only memory, CD-ROM), a universal serial bus flash disk (universal serial bus flash disk), a removable hard disk or another compact disc storage, a magnetic disk storage medium or another magnetic storage device, or any other medium that can be for carrying or storing expected program code in a form of instructions or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application should be subject to the protection scope of the claims.

What is claimed is:

1. A communication method, applied to a first access network device, and comprising:

receiving a first data packet of a first session from a core network device, wherein the first data packet comprises a first sequence number (SN), wherein the first data packet is comprised in data packets of the first session, SNs of the data packets are set to correspond to general packet radio service (GPRS) tunneling protocol-user plane (GPRS tunneling protocol-user plane, GTP-U) SNs of the data packets, and the SNs of the data packets are arranged in ascending order of the GTP-U SNs; and sending a second data packet to a terminal device, wherein the second data packet belongs to data of a first data radio bearer (DRB), the second data packet comprises a packet data convergence protocol (PDCP) protocol data unit (PDU), the PDCP PDU is obtained based on the first data packet, and a PDCP SN of the PDCP PDU is determined based on the first SN;

wherein the first data packet belongs to a data packet of a first quality of service (QoS) flow, the first QoS flow belongs to one of at least one QoS flow comprised in the first session, the first QoS flow is in a one-to-one correspondence with the first DRB, and the first SN is a QoS flow identifier (QFI) SN.

2. The method according to claim 1, wherein the first session is in a one-to-one correspondence with the first DRB, and the first SN is a GTP-U SN.

3. The method according to claim 1, further comprising:

sending first information to the core network device, wherein the first information indicates a mapping relationship between at least one QoS flow comprised in the first session and at least one DRB, and the at least one DRB comprises the first DRB.

4. The method according to claim 3, wherein the first information indicates a mapping relationship between each of the at least one DRB and one or more of the at least one QoS flow.

5. The method according to claim 1, wherein the first DRB corresponds to all or a part of at least one QoS flow comprised in the first session; and the first SN comprises a first GTP-U SN, a first PDCP SN is N0, and the method further comprises:

receiving at least one third data packet from the core network device, wherein the at least one third data packet is mapped to the first DRB, and a GTP-U SN comprised in the at least one third data packet is greater than the first GTP-U SN; and determining that a PDCP SN corresponding to an $i^{th}$ third data packet in the at least one third data packet that is sorted in a first order is N0+i, wherein the first order comprises an ascending order of GTP-U SNs separately comprised in the at least one third data packet, and i is an integer greater than or equal to 0.

6. The method according to claim 5, further comprising:

sending second information to a second access network device, wherein the second information indicates a correspondence between at least one PDCP SN and at least one GTP-U SN, and the correspondence comprises at least one of the following:

N0 corresponds to the first GTP-U SN;

N0+i corresponds to a GTP-U SN of the $i^{th}$ third data packet in the at least one third data packet that is sorted in the first order; or N0+I+1 corresponds to M+1, wherein I is a quantity of the at least one third data packet, and M is a GTP-U SN of an $I^{th}$ third data packet in the at least one third data packet that is sorted in the first order.

7. The method according to claim 1, wherein the first SN further comprises a QFI SN, and the method further comprises:

determining, based on a quantity of consecutively lost data packets in all QoS flows corresponding to the first DRB, a PDCP SN of a data packet with a smallest GTP-U SN after the consecutively lost data packets.

8. The method according to claim 1, further comprising:

determining a PDCP SN corresponding to the first SN, wherein the PDCP SN of the PDCP PDU comprises the PDCP SN corresponding to the first SN.

9. A communication apparatus, comprising:

a memory, configured to store instructions; and at least one processor, configured to invoke the instructions from the memory and execute the instructions, to enable the communication apparatus to perform operations comprising:

receiving a first data packet of a first session from a core network device, wherein the first data packet comprises a first sequence number (SN), wherein the first data packet is comprised in data packets of the first session, SNs of the data packets are set to correspond to general packet radio service (GPRS) tunneling protocol-user plane (GPRS tunneling protocol-user plane, GTP-U) SNs of the data packets, and the SNs of the data packets are arranged in ascending order of the GTP-U SNs; and sending a second data packet to a terminal device, wherein the second data packet belongs to data of a first data radio bearer (DRB), the second data packet comprises a packet data convergence protocol (PDCP) protocol data unit (PDU), the PDCP PDU is obtained based on the first data packet, and a PDCP SN of the PDCP PDU is determined based on the first SN;

wherein the first data packet belongs to a data packet of a first quality of service (QoS) flow, the first QoS flow belongs to one of at least one QoS flow comprised in the first session, the first QoS flow is in a one-to-one correspondence with the first DRB, and the first SN is a QoS flow identifier (QFI) SN.

10. The communication apparatus according to claim 9, wherein the first session is in a one-to-one correspondence with the first DRB, and the first SN is a GTP-U SN.

11. The communication apparatus according to claim 9, the operations further comprising:

sending first information to the core network device, wherein the first information indicates a mapping relationship between at least one QoS flow comprised in the first session and at least one DRB, and the at least one DRB comprises the first DRB.

12. The communication apparatus according to claim 11, wherein the first information indicates a mapping relationship between each of the at least one DRB and one or more of the at least one QoS flow.

13. The communication apparatus according to claim 9, wherein the first DRB corresponds to all or a part of at least one QoS flow comprised in the first session; and the first SN comprises a first GTP-U SN, a first PDCP SN is N0, and the operations further comprising:

receiving at least one third data packet from the core network device, wherein the at least one third data packet is mapped to the first DRB, and a GTP-U SN comprised in the at least one third data packet is greater than the first GTP-U SN; and determining that a PDCP SN corresponding to an $i^{th}$ third data packet in the at least one third data packet that is sorted in a first order is N0+i, wherein the first order comprises an ascending order of GTP-U SNs separately comprised in the at least one third data packet, and i is an integer greater than or equal to 0.

14. The communication apparatus according to claim 13, the operations further comprising:

sending second information to a second access network device, wherein the second information indicates a correspondence between at least one PDCP SN and at least one GTP-U SN, and the correspondence comprises at least one of the following:

N0 corresponds to the first GTP-U SN;

N0+i corresponds to a GTP-U SN of the $i^{th}$ third data packet in the at least one third data packet that is sorted in the first order; or N0+I+1 corresponds to M+1, wherein I is a quantity of the at least one third data packet, and M is a GTP-U SN of an $I^{th}$ third data packet in the at least one third data packet that is sorted in the first order.

15. The communication apparatus according to claim 9, wherein the first SN further comprises a QFI SN, and the operations further comprising:

determining, based on a quantity of consecutively lost data packets in all QoS flows corresponding to the first DRB, a PDCP SN of a data packet with a smallest GTP-U SN after the consecutively lost data packets.

16. The communication apparatus according to claim 9, the operations further comprising:

determining a PDCP SN corresponding to the first SN, wherein the PDCP SN of the PDCP PDU comprises the PDCP SN corresponding to the first SN.

* * * * *